(12) United States Patent
Nihei et al.

(10) Patent No.: US 12,249,768 B2
(45) Date of Patent: Mar. 11, 2025

(54) ANTENNA DEVICE AND DISPLAY ANTENNA

(71) Applicant: NEC Corporation, Tokyo (JP)

(72) Inventors: Ryota Nihei, Tokyo (JP); Junichi Funada, Tokyo (JP); Kenji Wakafuji, Tokyo (JP); Kazuyuki Hayashi, Tokyo (JP); Kohei Yoshida, Tokyo (JP); Shingo Watanabe, Tokyo (JP); Kazushi Sugyo, Tokyo (JP); Masakazu Ono, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/517,462

(22) Filed: Nov. 22, 2023

(65) Prior Publication Data

US 2024/0178576 A1    May 30, 2024

(30) Foreign Application Priority Data

Nov. 30, 2022 (JP) .................................. 2022-191415
Apr. 26, 2023 (JP) .................................. 2023-072390

(51) Int. Cl.
| | |
|---|---|
| G06F 3/0488 | (2022.01) |
| G06F 3/041 | (2006.01) |
| G06F 3/044 | (2006.01) |
| H01Q 1/22 | (2006.01) |
| H01Q 21/06 | (2006.01) |

(52) U.S. Cl.
CPC ......... *H01Q 21/065* (2013.01); *G06F 3/0416* (2013.01); *G06F 3/0446* (2019.05); *G06F 3/0488* (2013.01); *H01Q 1/22* (2013.01)

(58) Field of Classification Search
CPC ... G06F 3/0446; G06F 3/0416; H01Q 21/065; H01Q 1/22
See application file for complete search history.

(56) References Cited

U.S. PATENT DOCUMENTS 4,937,585 A * 6/1990 Shoemaker .......... H01Q 21/065
                                                    343/777
2017/0338564 A1* 11/2017 Gu ........................ H01Q 21/06

FOREIGN PATENT DOCUMENTS

JP         2020-201486 A    12/2020

* cited by examiner

*Primary Examiner* — Kevin M Nguyen

(57) ABSTRACT

Provided is an antenna device including an antenna array including a plurality of patch antennas arrayed in a grid, a first switch group including a first switch disposed on a wiring line connecting two adjacent patch antennas, and a second switch group including a second switch disposed on a wiring line between an antenna assembly formed by at least four adjacent patch antennas and a signal source connected to at least one patch antenna constituting the antenna assembly.

9 Claims, 25 Drawing Sheets

ANTENNA DEVICE AND DISPLAY ANTENNA

This application is based upon and claims the benefit of priority from Japanese Patent Application No. 2022-191415, filed on Nov. 30, 2022, and Japanese Patent Application No. 2023-072390, filed on Apr. 26, 2023, the disclosure of which is incorporated herein in its entirety by reference.

TECHNICAL FIELD

The present disclosure relates to an antenna device or the like including a plurality of patch antennas.

BACKGROUND ART

For mobile communication after the fifth generation mobile communication system (5G), planar antennas compatible with the radio wave in a higher frequency band than that before the fourth generation mobile communication system (4G) have been developed. A phased array antenna can be configured by using an antenna array in which a plurality of planar antennas are arrayed in an array.

PTL 1 (JP 2020-201486 A) discloses a display device including a display panel having an antenna function. The device of PTL 1 includes a display layer and a display panel. The display layer includes a plurality of light emitting elements disposed on the substrate. The display panel includes a sensor electrode layer disposed on the display layer. The sensor electrode layer includes a sensor region and a sensor peripheral region. A plurality of sensor electrodes are disposed in the sensor region. A plurality of sensor wiring lines, a first conductive pattern, and a second conductive pattern are disposed in the sensor peripheral region.

By using the method of PTL 1, a patch antenna is disposed in part of an electrode pattern for a touch sensor, so that a display having functions of the touch sensor and the patch antenna can be achieved. Regarding the array pattern of the touch sensor electrodes, there is an optimal pitch between adjacent electrodes. The patch antenna has an optimum size according to the wavelength band of the radio wave to be received. In the method of PTL 1, since the array pattern of the touch sensor electrodes and the size of the patch antenna cannot be changed, the wavelength band of the radio wave to be received cannot be changed.

An object of the present disclosure is to provide an antenna device or the like that has a function of a touch panel and can change a wavelength band of a radio wave to be transmitted and received.

SUMMARY

An antenna device according to an aspect of the present disclosure includes an antenna array including a plurality of patch antennas arrayed in a grid, a first switch group including a first switch disposed on a wiring line connecting two adjacent patch antennas, and a second switch group including a second switch disposed on a wiring line between an antenna assembly formed by at least four adjacent patch antennas with a signal source connected to at least one patch antenna constituting the antenna assembly.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
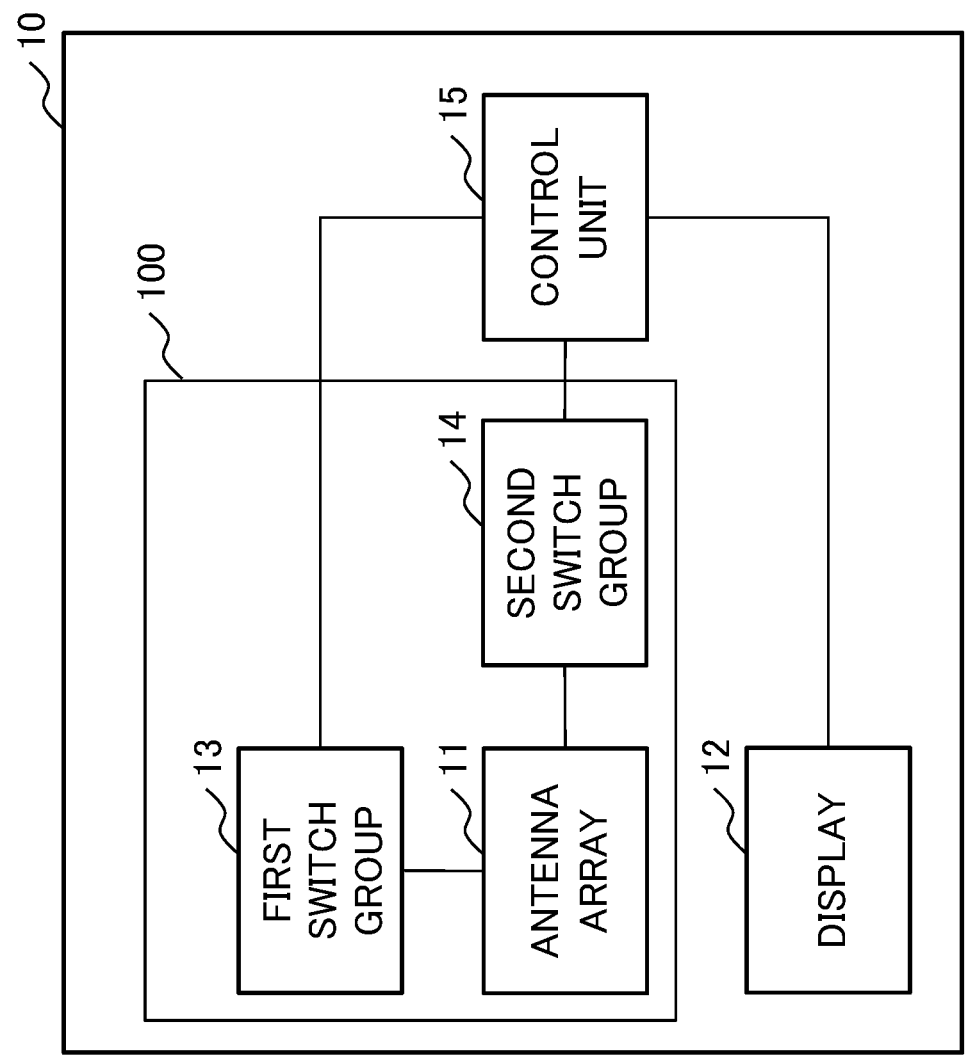
FIG. 1 is a block diagram illustrating an example of a configuration of a display antenna according to the present disclosure.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a display antenna according to a first example embodiment will be described with reference to the drawings. The display antenna of the present example embodiment includes a display having the functions of a touch sensor and an antenna. In the present example embodiment, an example in which an antenna assembly includes a plurality of patch antennas will be described. The antenna assembly can function as a phased array antenna and a touch sensor.

(Configuration)

FIG. 1 is a block diagram illustrating an example of a configuration of a display antenna 10 according to the present disclosure. The display antenna 10 includes an antenna array 11, a display 12, a first switch group 13, a second switch group 14, and a control unit 15. The antenna array 11, the first switch group 13, and the second switch group 14 constitute an antenna device 100. The control unit 15 may be added to the antenna device 100. The display antenna 10 has a structure in which the antenna device 100 is superimposed on the display 12. For example, the antenna device 100 and the display 12 may be provided as separate products.

The antenna array 11 includes a plurality of patch antennas. The patch antenna is a plate-shaped radiation element. For example, the patch antennas are square. The patch antenna may be rectangular. As long as the patch antenna can receive the radio wave in a wavelength band to be transmitted and received, it may have a shape other than a square or a rectangle. The patch antenna is a transparent electrode capable of transmitting light in a wavelength band in a visible region. For example, the patch antenna is made of a material such as indium tin oxide, zinc oxide, tin oxide, or titanium oxide. The material of the patch antenna is not limited as long as light in the wavelength band in the visible region can be transmitted. The patch antenna may be made of a material that transmits light in a wavelength band that is not in the visible region. For example, the patch antenna may be made of a material that transmits light in a near-infrared region, an infrared region, or an ultraviolet region.

Figure 2:
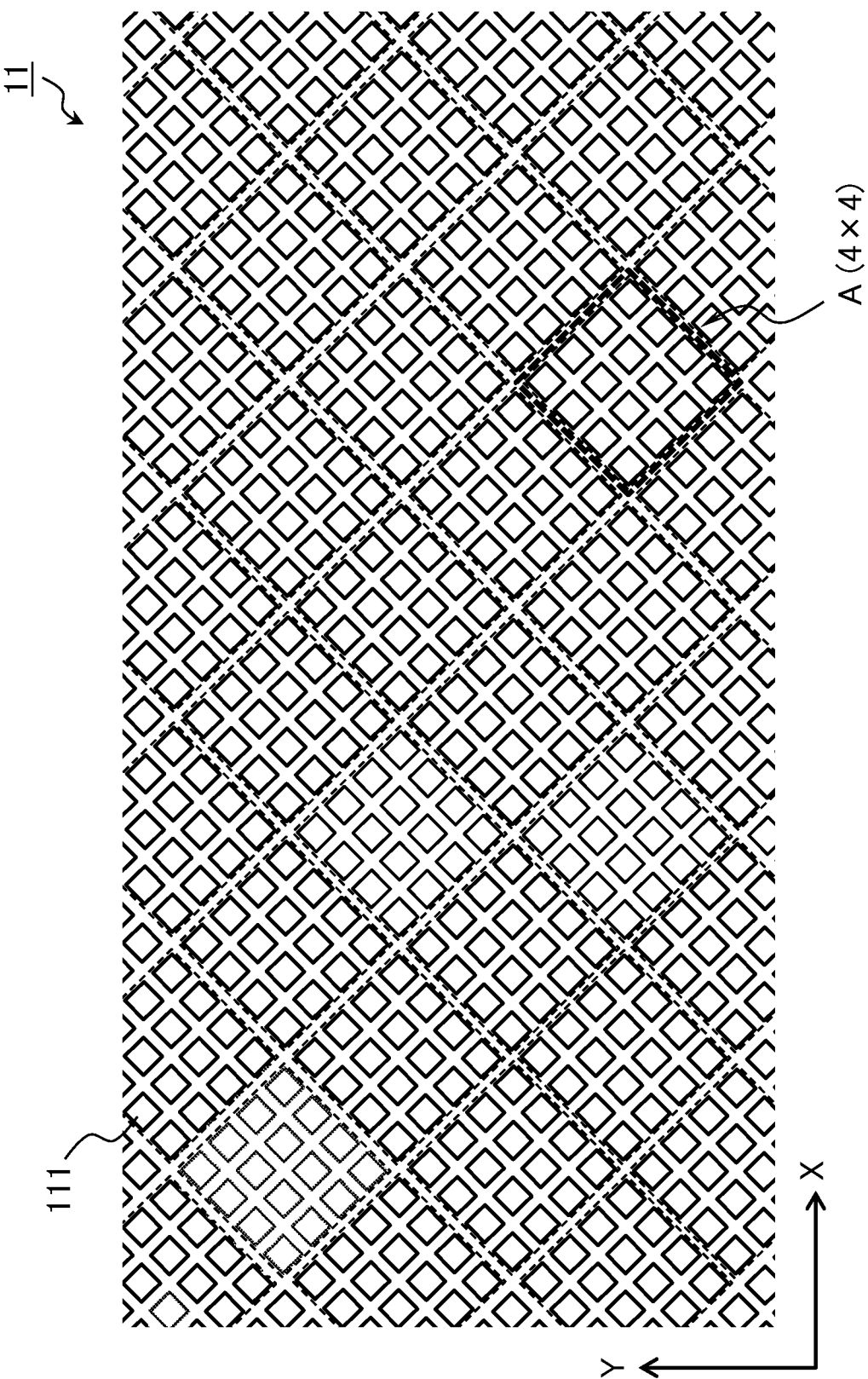
FIG. 2 is a conceptual diagram illustrating an example of a configuration of an antenna array included in a display antenna according to the present disclosure.

FIG. 2 is a conceptual diagram illustrating an example of a configuration of the antenna array 11. The antenna array 11 has a configuration in which a plurality of patch antennas 111 is arrayed in a two-dimensional array. The patch antenna 111 resonates at a frequency that matches an integral multiple of a ½ wavelength of a length related to one side. The size of the patch antenna 111 is set according to the wavelength of the radio wave to be transmitted and received. In the example of FIG. 2, the patch antennas 111 are square. The plurality of patch antennas 111 form a pattern (diamond shaped pattern) in which they are arrayed in a state of being rotated by 45 degrees with the intersection of the diagonal lines of the squares forming the outer shape of the patch antennas 111 as the rotation center. That is, the plurality of patch antennas 111 is arrayed in a diamond shaped pattern. As long as the functions of the touch sensor and the phased array antenna can be exerted, the plurality of patch antennas 111 may be arrayed in a pattern other than the diamond shaped pattern.

The plurality of patch antennas 111 is arrayed in a two-dimensional array along the X direction and the Y direction. The plurality of patch antennas 111 is grouped in units of several patch antennas 111. The plurality of grouped patch antennas 111 constitute an antenna assembly. In the example of FIG. 2, an antenna assembly A arrayed in 4×4 is configured with a group of 16 patch antennas 111 as a unit. As described later, in the display antenna 10 of the present example embodiment, the number and combination of the patch antennas 111 constituting the antenna assembly A can be changed in any number and combination.

The optimal size of the patch antenna 111 used in the frequency band related to mobile communication after the fifth generation mobile communication system (5G) is different from the optimal size of the sensor electrode used for the touch panel. With respect to the wavelength λ in the space of the radio wave to be transmitted and received, if the interval (pitch) between the adjacent patch antennas 111 is made larger than 0.7λ, the side lobe increases and the gain decreases. The wider the pitch of the adjacent patch antennas 111, the narrower the scanning angle. Therefore, the pitch of the adjacent patch antennas 111 is preferably set to about 0.4 to 0.5λ. The optimum size of the patch antenna 111 and the optimum pitch of the electrodes of the touch panel are different according to the frequency band related to mobile communication after 5G. In the present example embodiment, the number and combination of the patch antennas 111 constituting the antenna assembly A are changed according to the wavelength of the radio wave to be transmitted and received, thereby supporting a plurality of wavelength bands.

Figure 3:
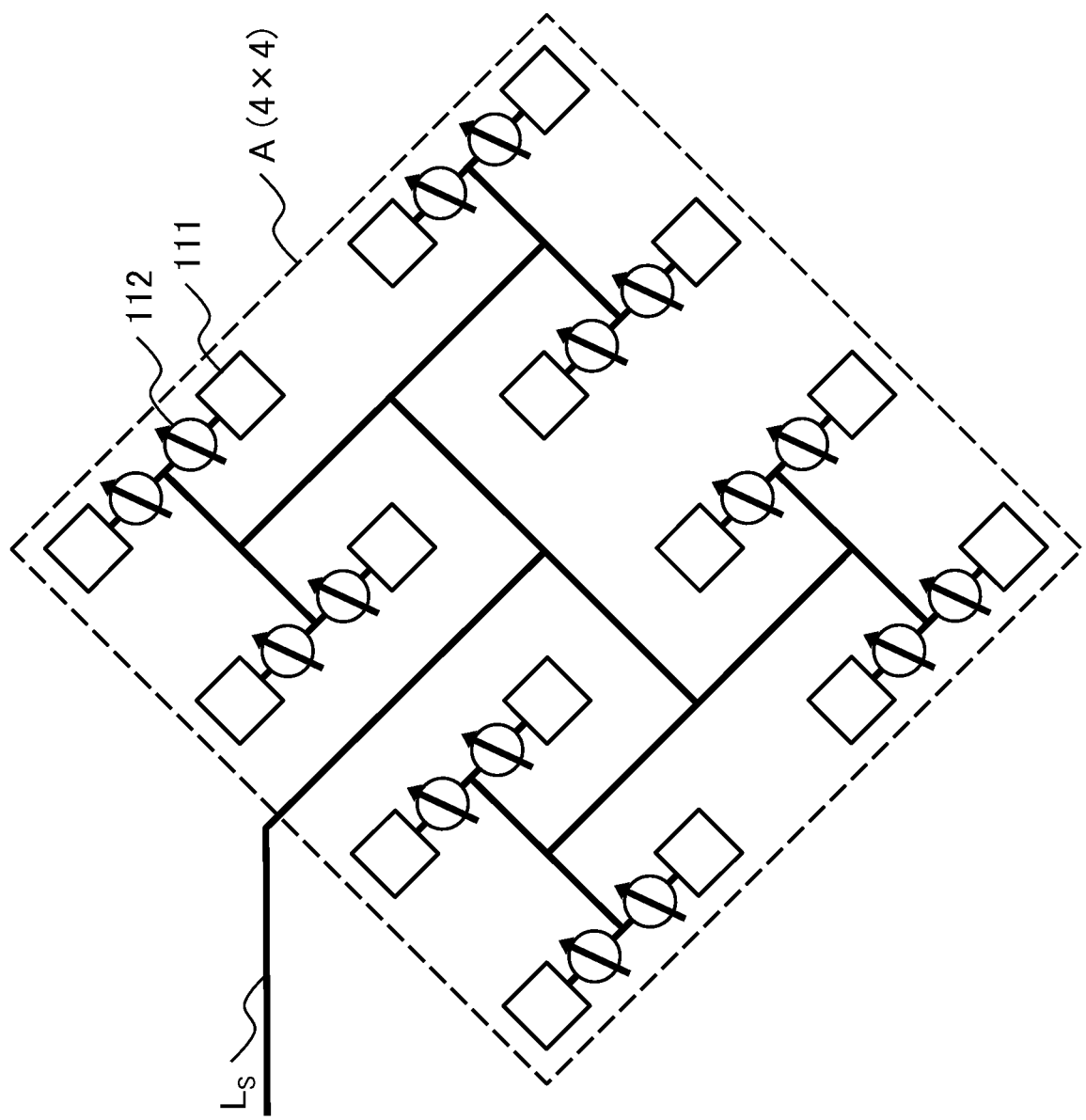
FIG. 3 is a conceptual diagram illustrating an example of an antenna assembly included in an antenna array included in a display antenna according to the present disclosure.

FIG. 3 is a conceptual diagram of an antenna assembly A included in the antenna array 11. FIG. 3 illustrates an example of a circuit configuration of the patch antennas 111 constituting the antenna assembly A, and does not illustrate an actual size of the patch antennas 111. In FIG. 3, a configuration such as a switch disposed between the patch antennas 111 is omitted. The antenna array 11 includes a plurality of patch antennas 111 arrayed in a two-dimensional array. In the example of FIG. 3, the antenna assembly A includes 16 patch antennas 111. The combination of the patch antennas 111 constituting the antenna assembly A can be changed by controlling opening and closing of the first switch included in the first switch group 13.

With respect to FIG. 3, when the direct current component is not cut at the portion of a phase shifter 112, the antenna assembly A is regarded as one conductor in a low frequency. When the configuration for blocking the DC component is included in the phase shifter 112, the entire antenna assembly A can be formed into one conductor by providing a switch that avoids the portion of the phase shifter 112. In the present example embodiment, the antenna assembly A (4×4) of FIG. 3 is used as one unit of the touch sensor electrode.

The patch antenna 111 is connected to a signal line $L_S$ via the phase shifter 112. For example, the phase shifter 112 and the signal line $L_S$ are formed in a wiring layer (not illustrated) below the antenna layer in which the patch antenna 111 is formed. In the phase shifter 112, a phase shift amount for each phase shifter 112 is set. The phase shift amount set in phase shifter 112 may be fixed or changeable. A signal to be transmitted and received is propagated to the signal line $L_S$. Each of the plurality of patch antennas 111 constituting the antenna assembly A functioning as an antenna transmits a signal phase-shifted by the phase shifter 112. Each of the plurality of patch antennas 111 constituting the antenna assembly A functioning as an antenna transmits the received radio wave to the signal line $L_S$ via the phase shifter 112.

Figure 4:
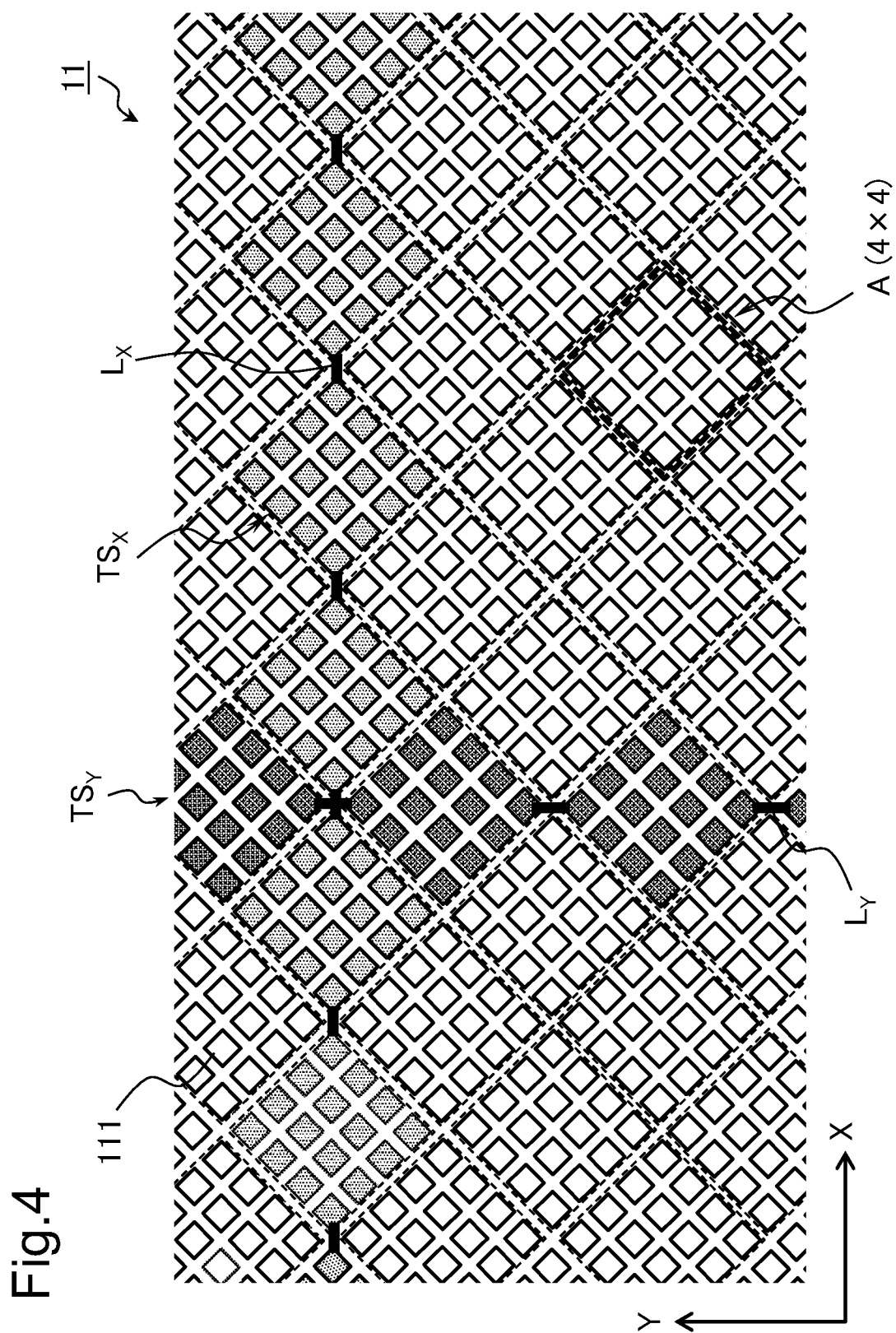
FIG. 4 is a conceptual diagram illustrating an example of a touch sensor included in an antenna array included in a display antenna according to the present disclosure.

FIG. 4 is a conceptual diagram illustrating an example of a state in which a touch sensor is set in the antenna array 11. In the example of FIG. 4, an antenna assembly A including 4×4 (16) patch antennas 111 as one set is configured. In the example of FIG. 4, part of the 4×4 (16) patch antennas 111 functions as an electrode of the touch sensor. The group of patch antennas 111 functioning as electrodes is divided into an antenna assembly A constituting a touch sensor $TS_X$ used for detection in the X direction and an antenna assembly A constituting a touch sensor $TS_Y$ used for detection in the Y direction. The patch antenna 111 used as the touch sensor can be selected under the control of the control unit 15. For the patch antenna 111 used as the touch sensor, the second switch is set to OFF. The patch antenna 111 that is not used as a touch sensor functions as a phased array antenna. The contact position is determined according to a change in capacitance at an intersection of a row constituted by the plurality of antenna assemblies A coupled in the X direction and a column constituted by the plurality of antenna assemblies A coupled in the Y direction.

Figure 5:
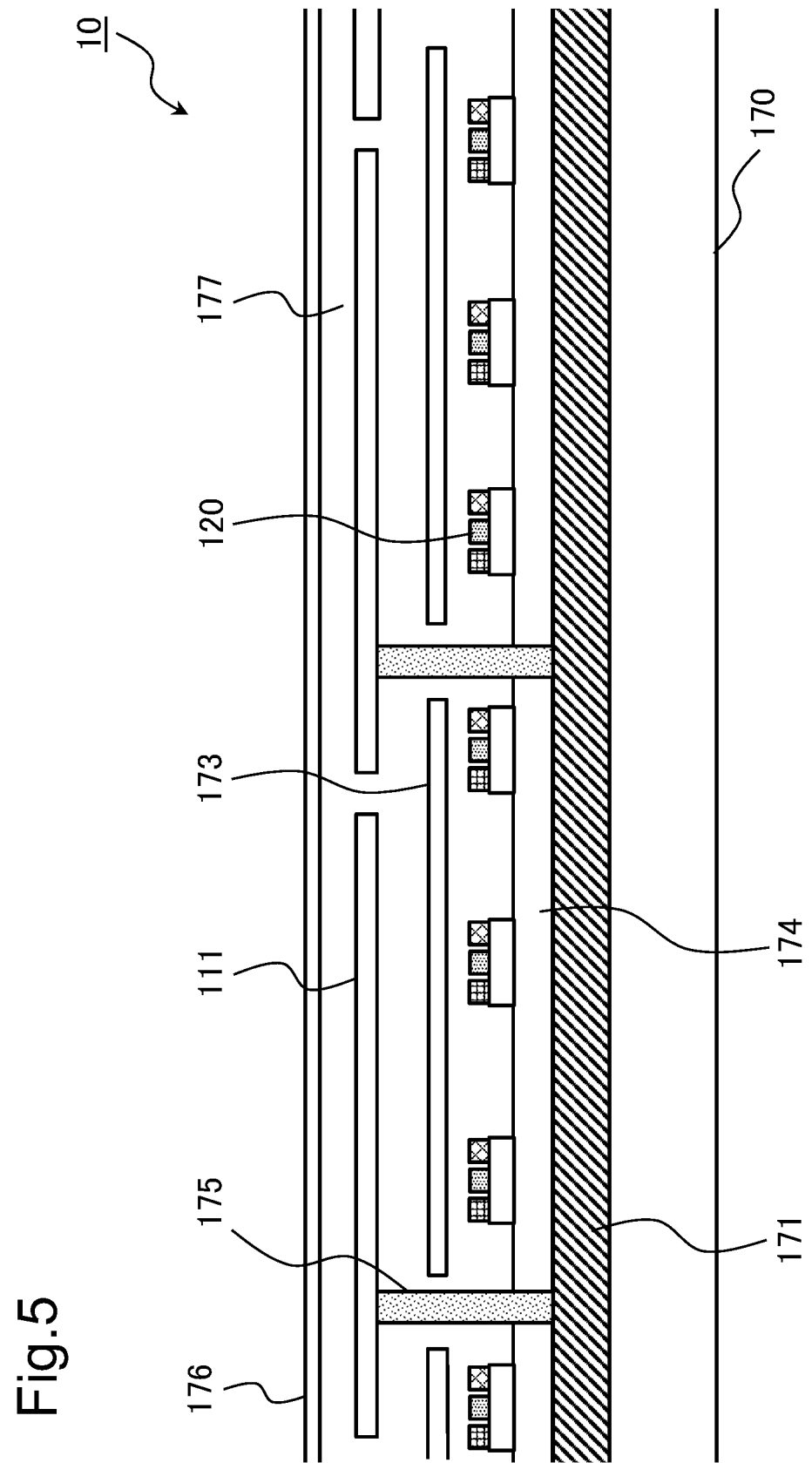
FIG. 5 is a cross-sectional view illustrating an example of an internal configuration of a display antenna according to the present disclosure.

FIG. 5 is a cross-sectional view for explaining an example of a structure of the display antenna 10. In FIG. 5, part of the configuration of the display antenna 10 is omitted. In the cross-sectional view of FIG. 5, hatching is omitted. A wiring layer 171 is formed on a substrate 170. In the wiring layer 171, a first switch included in the first switch group 13, a second switch included in the second switch group 14, the phase shifter 112 connected to the patch antenna 111, various wiring lines, and the like are disposed. In the wiring layer 171, a signal line $L_S$ for propagating a signal to be transmitted and received, a wiring line for driving the display 12, and the like are disposed. The wiring layer 171 may be a single layer or may have a structure in which a plurality of layers is stacked. For example, by using a device transfer technique, a minute element can be formed in the wiring layer 171. The drawings are omitted for details such as components in the wiring layer 171 and a connection relationship between the components.

The display 12 is formed above the wiring layer 171. The display 12 includes a plurality of light emitters 120. The plurality of light emitters 120 is disposed in a two-dimensional array. For example, the light emitter 120 includes a light emitting unit that emits light in a wavelength band related to each color of red (R), green (G), and blue (B). For example, the light emitter 120 is achieved by a micro light-emitting diode (LED). The micro LED includes a red LED that emits light in a red R wavelength band, a green LED that emits light in a green G wavelength band, and a blue LED that emits light in a blue B wavelength band. When light of three primary colors of red R, green G, and blue B can be emitted, various colors can be expressed by mixing these light beams. The light emitter 120 may include at least one of a red LED, a green LED, and a blue LED. The light emitter 120 may include a light emitting unit that emits light in a wavelength band different from those of the red LED, the green LED, and the blue LED. The light emitter 120 is connected to a driving unit (not illustrated) via wiring line formed in the wiring layer 171. The light emitter 120 causes the red LED, the green LED, and the blue LED to emit light in accordance with the control of the driving unit by the control unit 15.

Figure 6:
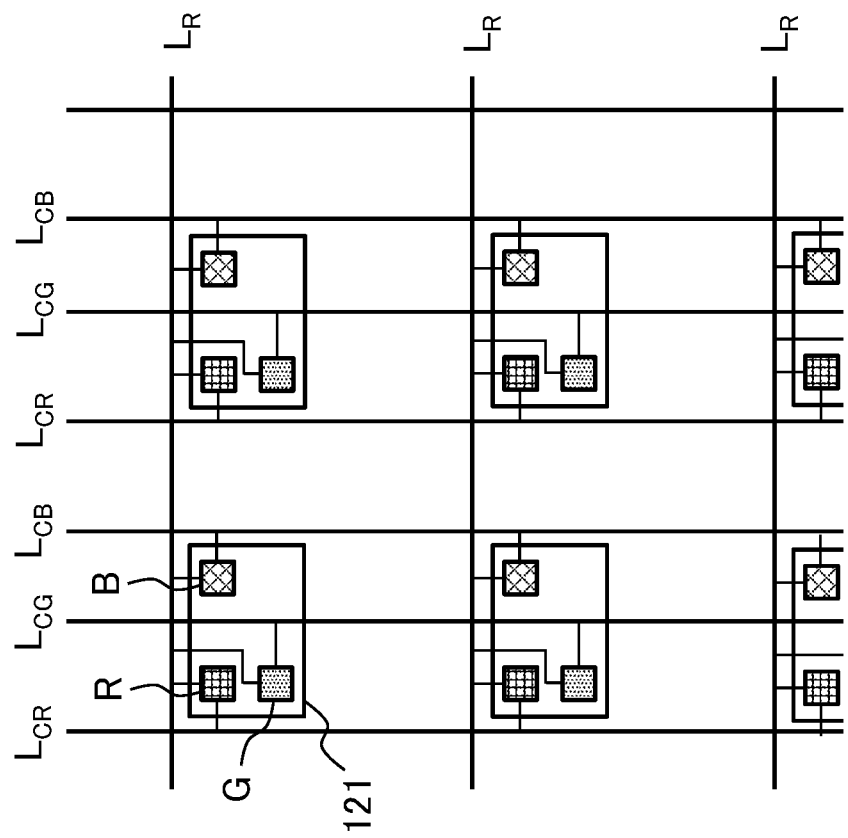
FIG. 6 is a conceptual diagram illustrating an example of a configuration of a display included in a display antenna according to the present disclosure.

FIG. 6 is a conceptual diagram illustrating a state in which an example (light emitter 121) of the light emitters 120 constituting the display 12 is arrayed. FIG. 6 illustrates a portion of the display 12 including a plurality of light emitters 121. In the light emitter 121, the red LED (R), the green LED (G), and the blue LED (B) are micro LEDs. The red LED, the green LED, and the blue LED are disposed in a concentrated manner in one place. A row selection line $L_R$ and a column selection line $L_{CR}$ are connected to the red LED. The row selection line $L_R$ and a column selection line $L_{CG}$ are connected to the green LED. The row selection line $L_R$ and a column selection line $L_{CB}$ are connected to the blue LED. The row selection line $L_R$ is a selection line common to the red LED, the green LED, and the blue LED. When the row selection line $L_R$ and the column selection line $L_{CR}$ are selected, the red LED emits light. When the row selection line $L_R$ and the column selection line $L_{CG}$ are selected, the green LED emits light. When the row selection line $L_R$ and the column selection line $L_{CB}$ are selected, the blue LED emits light.

Figure 7:
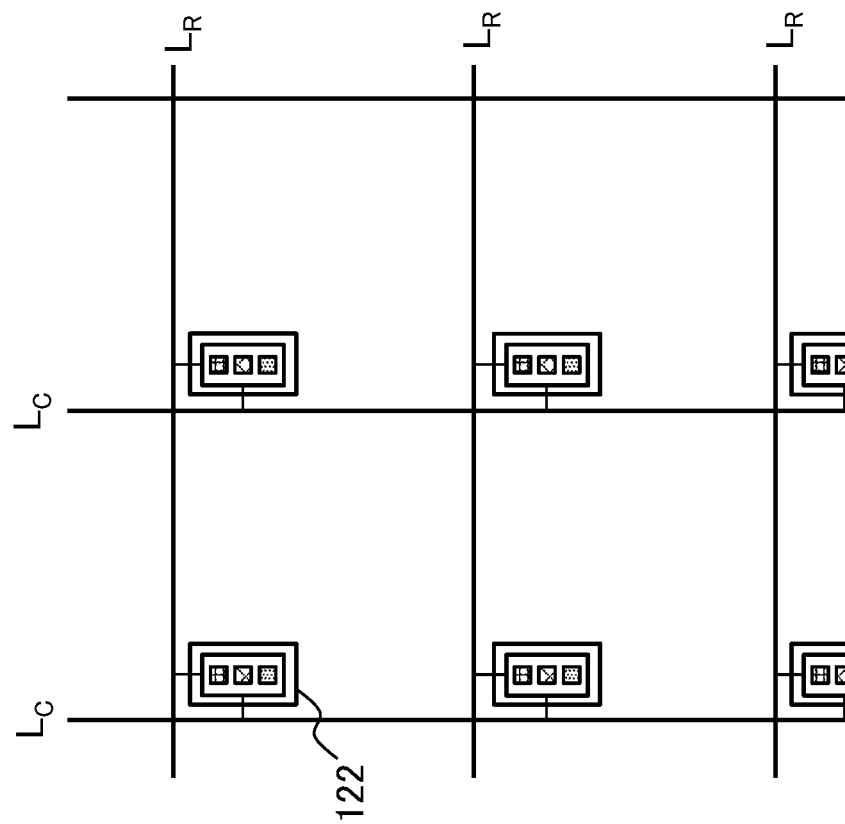
FIG. 7 is a conceptual diagram illustrating an example of a configuration of a display included in a display antenna according to the present disclosure.

FIG. 7 is a conceptual diagram illustrating a state in which another example (light emitter 122) of the light emitters 120 constituting the display 12 are arrayed. FIG. 7 illustrates a portion of the display 12 including a plurality of light emitters 122. The light emitter 122 is an integrated micro LED in which red, green, and blue light emitting units are integrated. The red LED, the green LED, and the blue LED are connected to the common row selection line $L_R$ and a common column selection line $L_C$. At least any one of the plurality of light emitters 122 is selected according to the selection of the row selection line $L_R$ and the column selection line $L_C$. Light emission of the micro LED included in the light emitter 122 is controlled by a signal supplied via the row selection line $L_R$ and the column selection line $L_C$ connected to the selected light emitter 122. The outer shape of the light emitter 122 in FIG. 7 is smaller than that of the light emitter 121 in FIG. 6. Therefore, the configuration of FIG. 7 has a larger space in which components other than the light emitter 120 can be disposed in the display layer than the configuration of FIG. 6.

The plurality of light emitters 120 constituting the display 12 emit light under the control of the control unit 15. The plurality of light emitters 120 is disposed in a two-dimensional array. An insulating layer 174 is formed between the display layer where the plurality of light emitters 120 is formed and the wiring layer 171. The material of the insulating layer 174 is not particularly limited.

An image is displayed on the display 12. For example, an image of a touch panel including at least one piece of input information is displayed on the display 12. For example, the input information is a button for receiving an operation. For example, the input information is an image of a key that receives input of characters, numbers, and symbols such as a keyboard and a numeric keypad. For example, the input information is an image that receives an operation, such as a slider or a tag. When contact is detected by the patch antenna 111 functioning as a touch sensor at the position of the input information displayed on the display 12, an input related to the operation detected at the position of the input information is performed.

A planarizing film or a protective film is formed above the display layer including the plurality of light emitters 120. The planarizing film and the protective film are transparent materials through which light in a wavelength band in a visible region can pass. The material of the planarizing film or the protective film is not limited as long as light in the wavelength band in the visible region can be transmitted. For example, the planarizing film and the protective film are achieved by silicon oxide or the like.

A plurality of ground electrodes 173 forming a shield layer is disposed above the display layer including the plurality of light emitters 120. The ground electrode 173 is formed to prevent electromagnetic coupling between above and below the ground electrode 173. The ground electrode 173 is made of a transparent electric conductor. For example, as in the patch antenna 111, the ground electrode 173 is made of a material such as indium tin oxide, zinc oxide, tin oxide, or titanium oxide. The material of the ground electrode 173 is not limited as long as light in the wavelength band in the visible region can be transmitted. The ground electrode 173 is connected to the housing and the ground terminal by a conductive wire (not illustrated) or the like. The potential of the ground electrode 173 is the same as the potential of the ground point to which the ground electrode 173 is connected. Therefore, a capacitance related to the dielectric constant of the dielectric layer or the space formed between the patch antenna 111 or the wiring layer 171 and the ground electrode 173 is formed.

The plurality of patch antennas 111 is disposed above the shield layer formed by the ground electrode 173. The plurality of patch antennas 111 is electrically connected to the signal line $L_S$ included in the wiring layer 171, other wiring lines, and the like via the feeding electrode 175. A feeding electrode 175 is a conductive via that connects the patch antenna 111 and the wiring layer 171. The material of the feeding electrode 175 is not particularly limited as long as it has conductivity.

A protective layer 176 is formed above the plurality of patch antennas 111. The protective layer 176 is formed of a member capable of transmitting light in a wavelength band in the visible region. The material of the protective layer 176 is not limited as long as light in the wavelength band in the visible region can be transmitted. For example, the protective layer 176 is achieved by a transparent member such as glass or plastic.

A dielectric layer 177 is formed in a space between the patch antenna 111 and the protective layer 176. The dielectric layer 177 is formed of a dielectric capable of transmitting light in a wavelength band of a visible region. The space between the wiring layer 171 and the protective layer 176 may be filled with a dielectric constituting the dielectric layer 177, or may be a gap formed. The material, shape, and position of the dielectric layer 177 are not particularly limited.

A signal to be transmitted is output from a transmission circuit (not illustrated). The signal output from the transmission circuit reaches the phase shifter 112 of each patch antenna 111 through the signal line $L_S$. The signal to be transmitted that has reached the phase shifter 112 is phase-shifted by a phase shift amount according to the phase shift amount for each phase shifter 112 and the capacitance based on the dielectric constant of the dielectric layer 177. The signal reaching the patch antenna 111 via the phase shifter 112 is transmitted as a radio wave in a wavelength band to be transmitted. The transmission direction of the radio wave transmitted from the display antenna 10 is controlled for each antenna assembly A.

The radio wave to be received by the patch antenna 111 is phase-shifted by a phase shift amount according to the phase shift amount of the phase shifter 112 connected to the patch antenna 111 and the capacitance based on the dielectric constant of the dielectric layer 177. The phase-shifted signal is received by a reception circuit (not illustrated) through the signal line $L_S$. Information included in the signal received by the reception circuit is decoded by a decoder (not illustrated).

The first switch group 13 includes a plurality of first switches. The first switch is disposed on a wiring line connecting two adjacent patch antennas 111. The first switch is a switch that switches connection between two adjacent patch antennas 111. The first switch is also used to switch the connection between adjacent antenna assemblies A. The first switch may be provided for each patch antenna 111 or may be provided for each antenna assembly A. When the first switch is provided for each antenna assembly A, the first switches of the plurality of patch antennas 111 constituting the antenna assembly A may be omitted. The plurality of first switches is formed in the wiring layer 171. The size of antenna assembly A can be changed by switching the open/close state of the first switch. The antenna assembly A functioning as the touch panel can be selected by switching the open/close state of the first switch.

The second switch group 14 includes a plurality of second switches. The second switch is disposed on the wiring line connecting the antenna assembly A formed by at least four adjacent patch antennas 111 and a signal source connected to at least one patch antenna 111 constituting the antenna assembly A. The second switch is a switch that switches connection between the antenna assembly A and the signal source. The signal source is a high frequency power source used for transmission of a radio wave to be transmitted. The signal source supplies high frequency power related to the frequency band of the radio wave to be transmitted and the transmission strength of the radio wave. The plurality of second switches is formed in the wiring layer 171. The antenna assembly A connected to the second switch in the closed state (ON) is supplied with high frequency power from a signal source.

Figure 8:
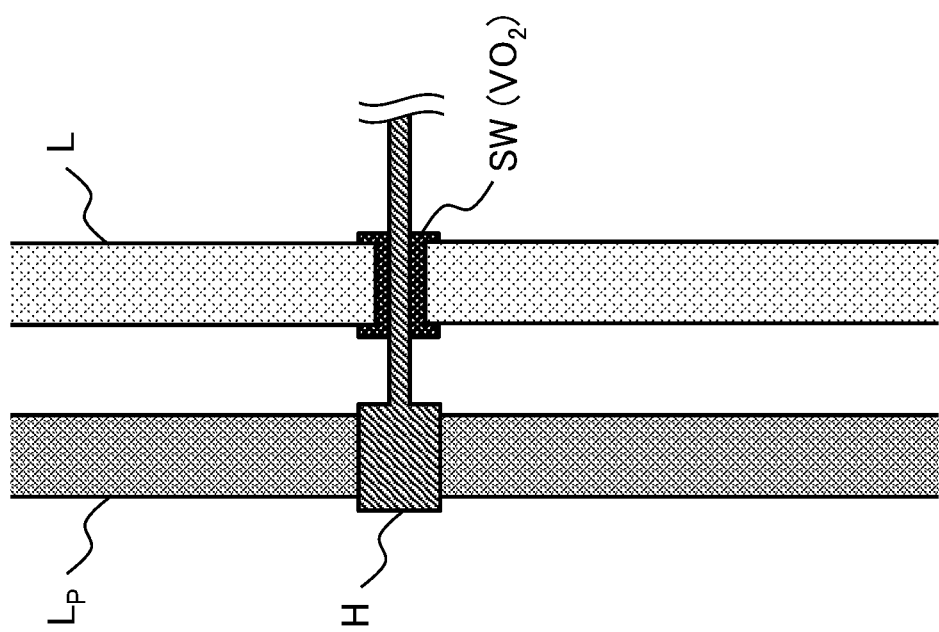
FIG. 8 is a conceptual diagram illustrating an example of a structure for achieving a switch included in a display antenna according to the present disclosure.

FIG. 8 is a conceptual diagram illustrating an example of a configuration for implementing the first switch and the second switch (hereinafter, referred to as a switch SW). FIG. 8 is an example of a switch SW utilizing metal-insulator phase transition (hereinafter, referred to as a phase transition) of vanadium dioxide $VO_2$. The switch SW of FIG. 8 includes a thin film of vanadium dioxide $VO_2$. When the temperature of the vanadium dioxide $VO_2$ is increased from room temperature, the electrical resistance of the vanadium dioxide $VO_2$ rapidly decreases at around 67 degrees Celsius, and the vanadium dioxide $VO_2$ undergoes a phase transition from an insulator to a metal. Vanadium dioxide $VO_2$ is in an insulating phase at a temperature lower than the phase transition temperature. Vanadium dioxide $VO_2$ is in a metal phase at a temperature higher than the phase transition temperature. In the actual phase transition of the vanadium dioxide $VO_2$, hysteresis occurs when the temperature increases and decreases. Therefore, the temperature design is preferably made in such a way that ON/OFF of the switch SW is switched in consideration of hysteresis.

In the example of FIG. 8, the switch SW is disposed on a wiring line L. A heating wire H is thermally connected to the switch SW. The heating wire H is electrically connected to a power supply line $L_P$. The electric heating wire H is used to control the temperature of the thin film of the vanadium dioxide $VO_2$ included in the switch SW. For example, the electric heating wire H is made of an alloy containing nickel Ni or chromium Cr as a main component. The electric heating wire H may be made of an alloy containing chromium Cr, iron Fe, and aluminum Al as main components. A material of the heating wire H is not particularly limited. When a current is supplied to the heating wire H via the power supply line $L_P$, the temperature of the heating wire rises. For example, the supply of the current to the heating wire H can be controlled using a thin film transistor (TFT). The heat of the electric heating wire H is transferred to the thin film of the vanadium dioxide $VO_2$ included in the switch SW. When the temperature of the thin film of vanadium dioxide $VO_2$ included in the switch SW exceeds the phase transition temperature, the thin film undergoes phase transition to the metal phase. As a result, the switch SW transitions to an ON state, and the wiring line L through which the switch SW intervenes is conducted. When the supply of the current to the heating wire H is stopped, the temperature of the heating wire decreases. When the temperature of the thin film of vanadium dioxide $VO_2$ included in the switch SW falls below the phase transition temperature, the thin film undergoes phase transition to an insulating phase. As a result, the switch SW transitions to an OFF state, and the wiring line L through which the switch SW intervenes is cut off.

The control unit 15 (control means) controls the antenna array 11 to configure the antenna assembly A. The control unit 15 sets the size of antenna assembly A in accordance with the frequency band of the radio wave to be transmitted and received. The control unit 15 switches ON/OFF of the plurality of first switches SW1 included in the first switch group 13 to change the combination of the patch antennas 111 constituting the antenna assembly A. As a result, the size of antenna assembly A is set in accordance with the frequency band of the radio wave to be transmitted and received.

For example, in a case where the frequency band of the radio wave to be transmitted and received is 70 GHz (gigahertz) the control unit 15 sets the size of the antenna assembly A in such a way that the antenna assembly A has a square region with one side of 6.8 mm (millimeter). The control unit 15 switches the plurality of first switches SW1 to combine 16 (4×4) patch antennas 111 each having one side of 1.7 mm. The control unit 15 switches the plurality of first switches SW1 in such a way that the 16 patch antennas 111 have the same potential. As a result, 16 patch antennas 111 arrayed in 4×4 are combined to set an antenna assembly A of a rectangular area having one side of 6.8 mm. The control unit 15 sets a plurality of antenna assemblies A for the antenna array 11. The control unit 15 sets the first switch SW1 used for connection between adjacent antenna assemblies A to OFF. When a larger antenna assembly AG is configured by combining the plurality of antenna assemblies A, the control unit 15 sets the first switch SW1 used for connection between the adjacent antenna assemblies A to ON. An antenna assembly AG has a configuration in which a plurality of antenna assemblies A is combined. In this case, the control unit 15 sets the first switch SW1 used for connection between the adjacent antenna assemblies A to ON in accordance with the wavelength band of the radio wave to be transmitted and received.

The control unit 15 switches ON/OFF of the plurality of second switches SW2 included in the second switch group 14 in a state where the antenna assembly A is set. The control unit 15 switches the second switch SW2 connected to at least any one of the patch antennas 111 constituting the antenna assembly A used for transmission of the radio wave. The antenna assembly A including the patch antennas 111 connected to the second switch SW2 in the ON state is supplied with high frequency power from a signal source SG. As a result, the radio wave to be transmitted related to the signal propagated through the signal line $L_S$ is transmitted from the antenna assembly A.

The control unit 15 selects the antenna assembly A to function as the touch sensor. The control unit 15 selects adjacent antenna assemblies A in such a way that the plurality of antenna assemblies A to function as the touch sensor is arrayed in a mesh pattern. The control unit 15 electrically connects two adjacent antenna assemblies A among the selected antenna assemblies A. The first switch SW1 disposed on the wiring line connecting adjacent two antenna assemblies A among the antenna assemblies A to function as the touch sensor is switched to ON. As a result, a meshed touch sensor is formed by the plurality of antenna assemblies A connected by the first switch SW1 switched to ON. The contact position can be identified according to a change in electrostatic capacitance between a row constituted by the plurality of antenna assemblies A coupled in the X direction and a column constituted by the plurality of antenna assemblies A coupled in the Y direction. Details of the detection of the contact position by the control unit 15 will not be described.

For example, the control unit 15 selects a combination of the patch antennas 111 constituting the antenna assembly A set according to the size of the finger. In the case of the example of FIG. 4 described above, part of the touch panel electrode is configured by the antenna assembly A including 16 (4×4) patch antennas 111. The control unit 15 electrically connects the antenna assemblies A constituting the touch sensor $TS_X$ arrayed in the X direction by switching the first switch SW1 disposed on the wiring line $L_X$ in the X direction to ON. The control unit 15 electrically connects the antenna assemblies A constituting the touch sensor $TS_Y$ arrayed in the Y direction by switching the first switch SW1 disposed in the wiring line $L_Y$ in the Y direction to ON. The antenna assembly A used as the touch sensor may include patch antennas 111 whose number is not 16 (4×4). For example, the antenna assembly A used as the touch sensor may include 64 (8×8) patch antennas 111. For example, the antenna assembly A used as the touch sensor may include four (2×2) patch antennas 111.

Figure 9:
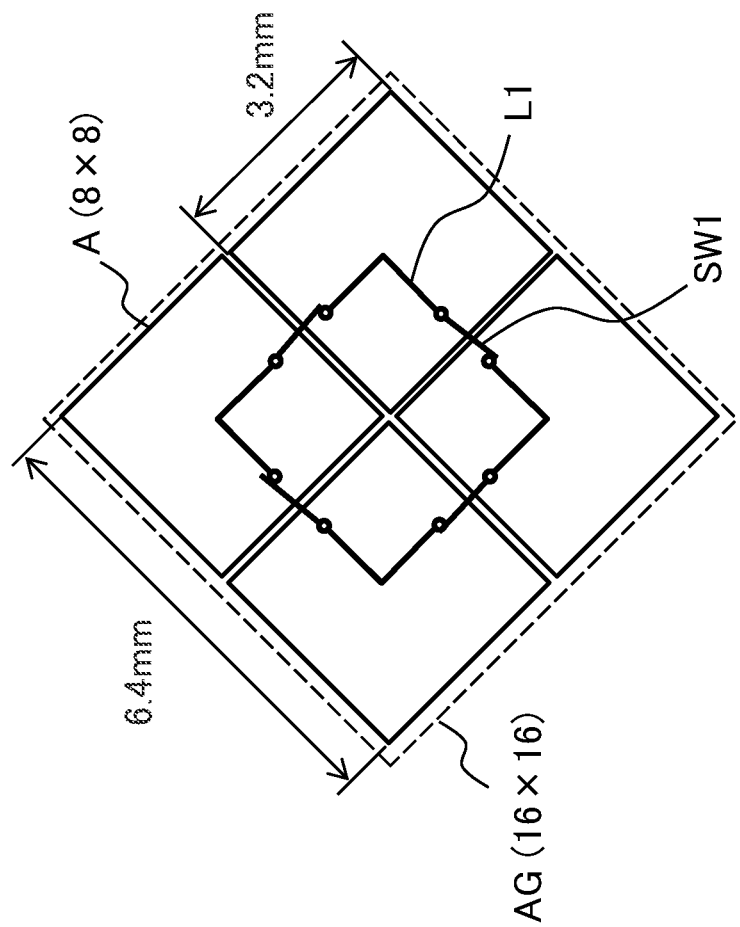
FIG. 9 is a conceptual diagram illustrating an example of an antenna assembly included in an antenna array included in a display antenna according to the present disclosure.

FIG. 9 is a conceptual diagram illustrating an example of a configuration of the antenna assembly AG (16×16) set according to the size of the finger. In the example of FIG. 9, one side of one antenna assembly A (8×8) is 3.2 mm. In the example of FIG. 9, antenna assembly A (8×8) is related to a frequency band of 300 GHz. The control unit 15 sets the antenna assembly AG (16×16) by combining the four antenna assemblies A (8×8) in such a way that the antenna assembly AG has a square region having one side of 6.4 mm according to the size of the finger. The control unit 15 switches the plurality of first switches SW1 to combine four antenna assemblies A (8×8) each having one side of 3.2 mm. As a result, 256 patch antennas 111 arrayed in 16×16 are combined, and an antenna assembly AG (16×16) having a rectangular region with one side of 6.4 mm is set. The control unit 15 sets a plurality of antenna assemblies AG functioning as a touch sensor with respect to the antenna array 11.

Figure 10:
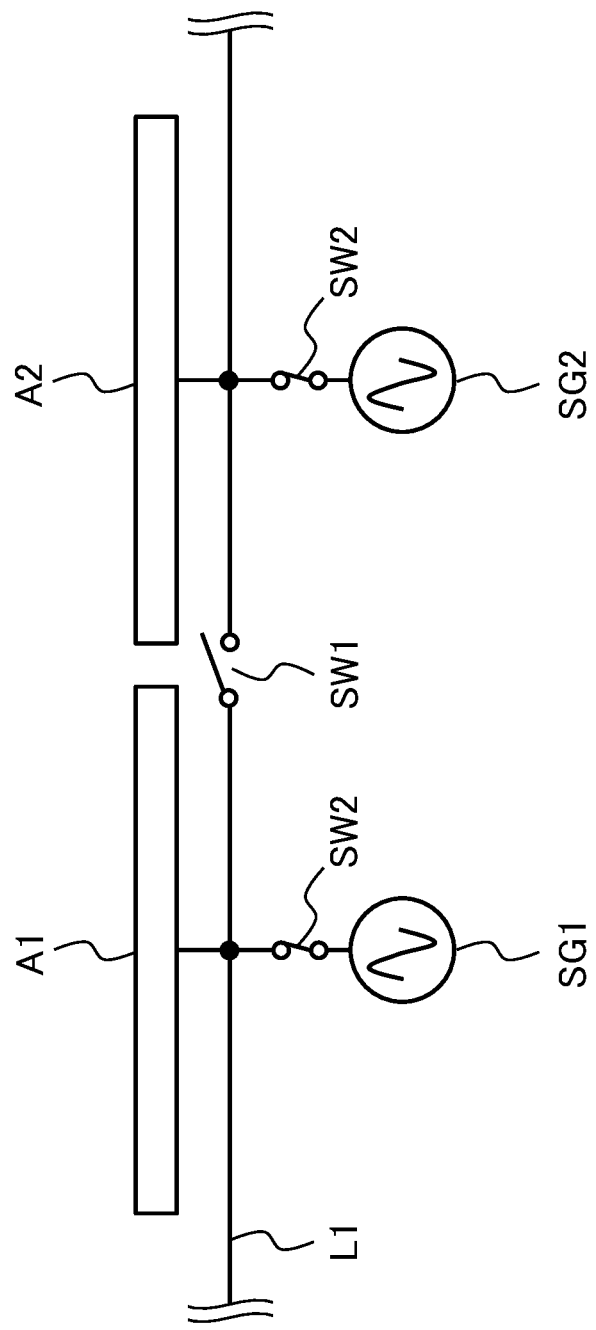
FIG. 10 is a conceptual diagram illustrating an example of a configuration of a switch included in a display antenna according to the present disclosure.
Figure 11:
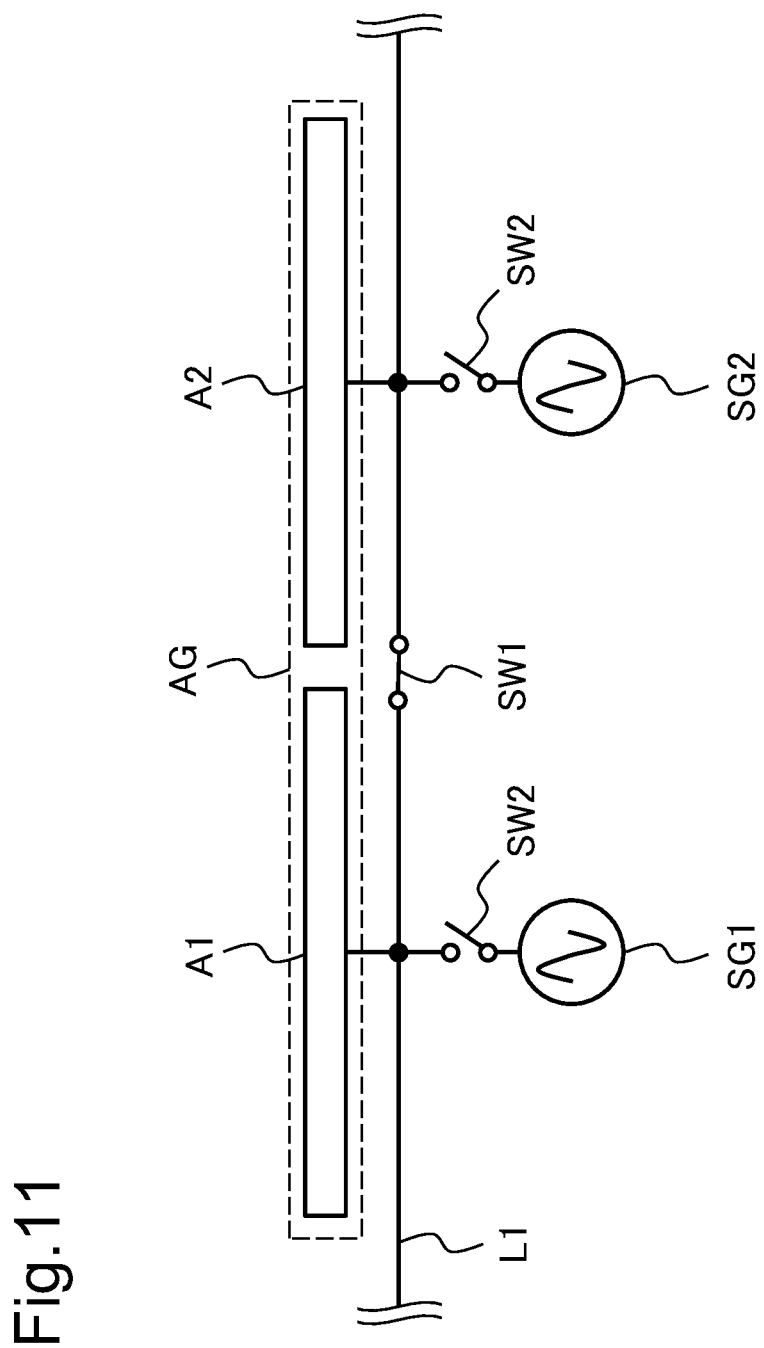
FIG. 11 is a conceptual diagram illustrating an example of a configuration of a switch included in a display antenna according to the present disclosure.

FIGS. 10 to 11 are conceptual diagrams illustrating an example of a configuration of the antenna assemblies A. FIGS. 10 to 11 are diagrams obtained by extracting two (antenna assembly A1, antenna assembly A2) of the plurality of antenna assemblies A. Each of the antenna assembly A1 and the antenna assembly A2 includes a plurality of patch antennas 111. The first switch SW1 is disposed on a wiring line L1 common to the plurality of antenna assemblies A. Adjacent antenna assembly A1 and antenna assembly A2 are electrically connected via the wiring line L1. The first switch SW1 is used to switch the connection between the antenna assembly A1 and the antenna assembly A2. The connection between the antenna assembly A1 and the antenna assembly A2 is switched according to opening and closing of the first switch SW1. The antenna assembly A1 is connected to a signal source SG1 via the second switch SW2. The antenna assembly A2 is connected to a signal source SG2 via the second switch SW2. In the examples of FIGS. 10 to 11, the configuration of the antenna assemblies A is switched by the first switch SW1 disposed in the vicinity of the signal source SG1 and the signal source SG2.

FIG. 10 is an example of a state (ON) in which the second switch SW2 is closed. In this case, the antenna assembly A1 and the antenna assembly A2 function as the phased array antenna. When the second switch SW2 is closed (ON), the signal source SG1 and the antenna assembly A1 are connected. The signal to be transmitted propagated through the signal line $L_S$ according to the high frequency power supplied from the signal source SG1 is transmitted as a wireless signal from the antenna assembly A1. Similarly, when the second switch SW2 is closed (ON), the signal source SG2 and the antenna assembly A2 are connected. The signal to be transmitted propagated through the signal line $L_S$ according to the high frequency power supplied from the signal source SG2 is transmitted as a wireless signal from the antenna assembly A2.

FIG. 11 is an example of a state (ON) in which the first switch SW1 is closed. In this case, the antenna assembly A1 and the antenna assembly A2 are combined to form the antenna assembly AG. In plan view, the antenna assembly AG includes a plurality of antenna assemblies A including the antenna assembly A1 and the antenna assembly A2. The antenna assembly AG functions as a touch sensor. The plurality of antenna assemblies AG functioning as the touch sensor is connected in a grid in the X direction and the Y direction to constitute part of the touch panel electrode.

Figure 12:
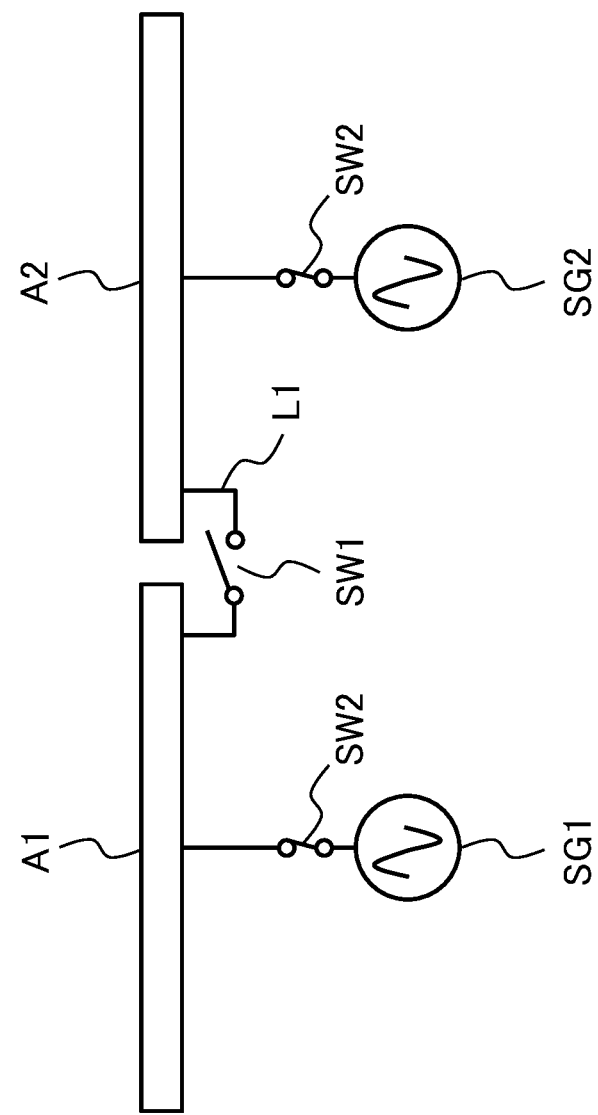
FIG. 12 is a conceptual diagram illustrating an example of a configuration of a switch included in a display antenna according to the present disclosure.
Figure 13:
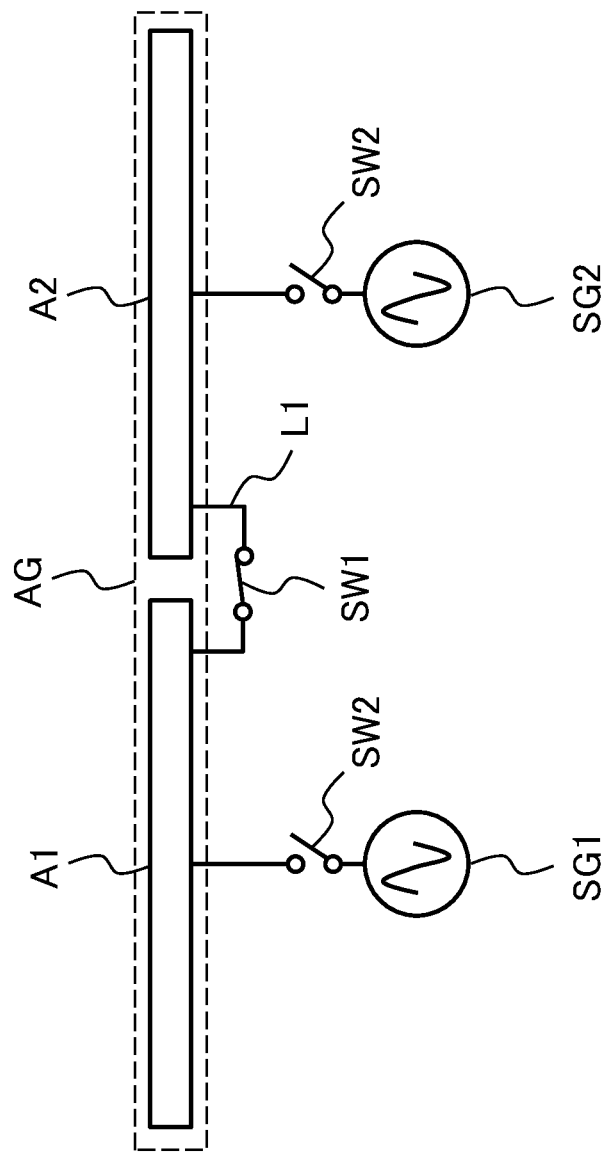
FIG. 13 is a conceptual diagram illustrating an example of a configuration of a switch included in a display antenna according to the present disclosure.

FIGS. 12 to 13 are conceptual diagrams illustrating an example of a configuration of antenna assemblies A. FIGS. 12 to 13 are diagrams obtained by extracting two (antenna assembly A1, antenna assembly A2) of the plurality of antenna assemblies A. Each of the antenna assembly A1 and the antenna assembly A2 includes a plurality of patch antennas 111. The first switch SW1 is disposed on the wiring line L1 that electrically connects the antenna assembly A1 and the antenna assembly A2. Adjacent antenna assembly A1 and antenna assembly A2 are electrically connected via the wiring line L1. The first switch SW1 is used to switch the connection between the antenna assembly A1 and the antenna assembly A2. The connection between the antenna assembly A1 and the antenna assembly A2 is switched according to opening and closing of the first switch SW1. The antenna assembly A1 is connected to a signal source SG1 via the second switch SW2. The antenna assembly A2 is connected to a signal source SG2 via the second switch SW2. In the examples of FIGS. 12 to 13, the configuration of the antenna assemblies A is switched by the first switch SW1 disposed in the vicinity of the patch antenna 111.

FIG. 12 is an example of a state (ON) in which the second switch SW2 is closed. In this case, the antenna assembly A1 and the antenna assembly A2 function as the phased array antenna. When the second switch SW2 is closed (ON), the signal source SG1 and the antenna assembly A1 are connected. The signal to be transmitted propagated through the wiring line L1 according to the high frequency power supplied from the signal source SG1 is transmitted as a wireless signal from the antenna assembly A1. Similarly, when the second switch SW2 is closed (ON), the signal source SG2 and the antenna assembly A2 are connected. The signal to be transmitted propagated through the wiring line L1 according to the high frequency power supplied from the signal source SG2 is transmitted as a wireless signal from the antenna assembly A2.

FIG. 13 illustrates an example (ON) in which the first switch SW1 is closed. In this case, the antenna assembly A1 and the antenna assembly A2 are combined to form the antenna assembly AG. In plan view, the antenna assembly AG includes a plurality of antenna assemblies A including the antenna assembly A1 and the antenna assembly A2. The antenna assembly AG functions as a touch sensor. The plurality of antenna assemblies AG functioning as the touch sensor is connected in a grid in the X direction and the Y direction to constitute part of the touch panel electrode.

Figure 14:
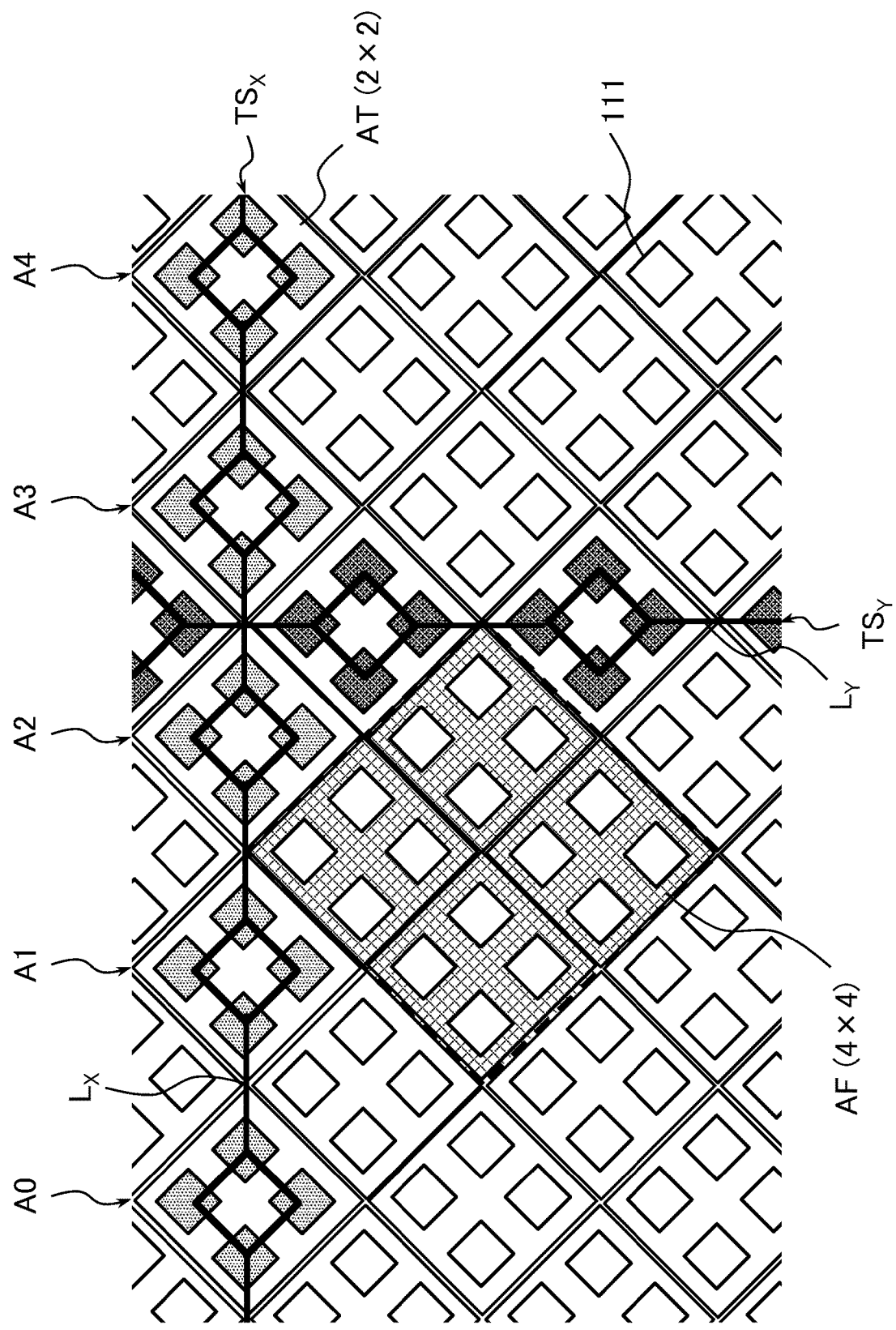
FIG. 14 is a conceptual diagram illustrating an example of a touch sensor included in an antenna array included in a display antenna according to the present disclosure.

FIG. 14 is a conceptual diagram illustrating a setting example of the touch sensor in the antenna array 11. In the example of FIG. 14, the number of patch antennas 111 constituting an antenna assembly AF that functions as an antenna and the number of patch antennas 111 constituting an antenna assembly AT that functions as a touch sensor are different. In the example of FIG. 14, the antenna assembly AF (4×4) is related to a frequency band of 40 GHz. The control unit 15 switches the plurality of first switches SW1 and combines 16 (4×4) patch antennas 111 each having one side of 3.0 mm to configure the antenna assembly AF (4×4). As a result, the antenna assembly AF (4×4) having a rectangular region with one side of 12 mm is set. The control unit 15 sets a plurality of antenna assemblies AF (4×4) functioning as the antenna with respect to the antenna array 11.

In the example of FIG. 14, the control unit 15 selects the antenna assembly AT (2×2) to function as the touch sensor. In the example of FIG. 14 (40 GHZ), one side of the antenna assembly AF (4×4) is 12 mm square. Therefore, the control unit 15 divides the antenna assembly AF (4×4) and sets the antenna assembly AT (2×2) functioning as the touch sensor. The control unit 15 switches the plurality of first switches SW1 to configure an antenna assembly AT (2×2) in which four (2×2) patch antennas 111 each having one side of 3.0 mm are combined. As a result, the four patch antennas 111 arrayed in 2×2 are combined to form the antenna assembly AT for the touch sensor. The control unit 15 switches the first switch SW1 disposed on a wiring line $L_X$ between the antenna assemblies AT that function as the touch sensor $TS_X$ for position detection in the X direction to ON. The control unit 15 switches the first switch SW1 disposed on the wiring line $L_Y$ between the antenna assemblies AT functioning as the touch sensor $TS_Y$ for position detection in the Y direction to ON. As a result, part of the touch panel electrode in which the touch sensor $TS_X$ for position detection in the X direction and the touch sensor $TS_Y$ for position detection in the Y direction are disposed in a mesh shape (in a grid) is formed.

Figure 15:
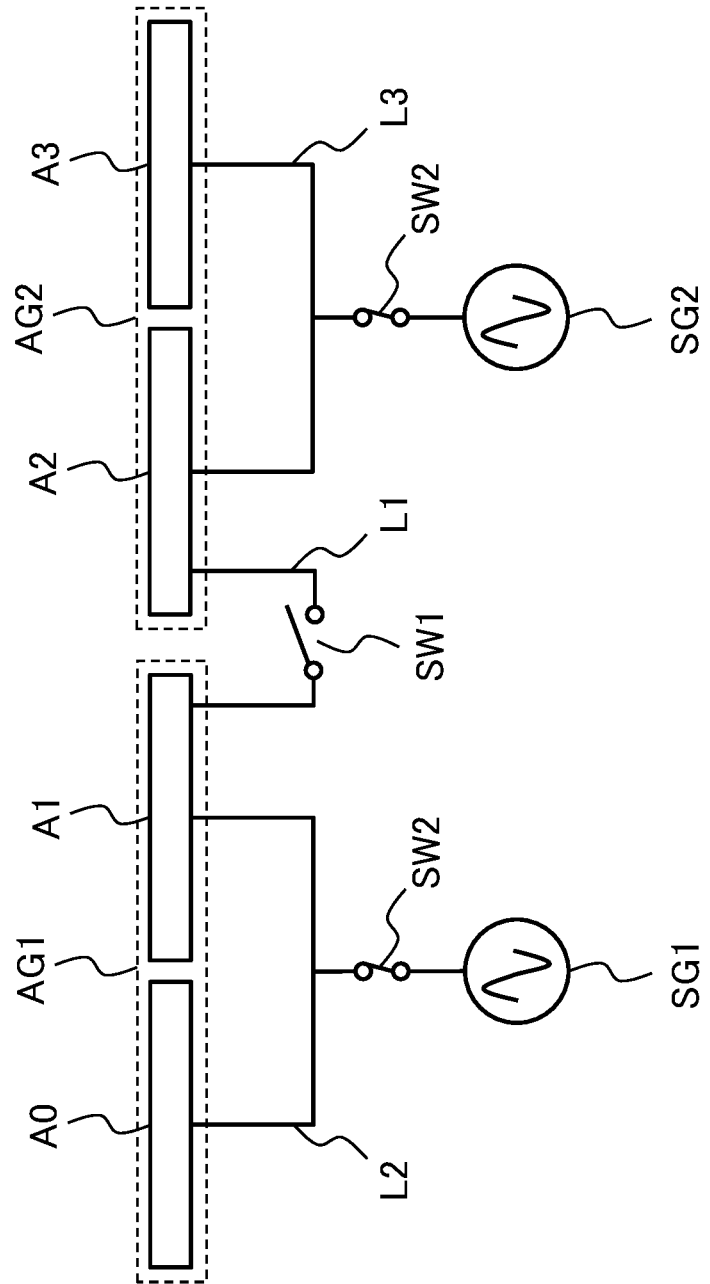
FIG. 15 is a conceptual diagram illustrating an example of a configuration of a switch included in a display antenna according to the present disclosure.
Figure 16:
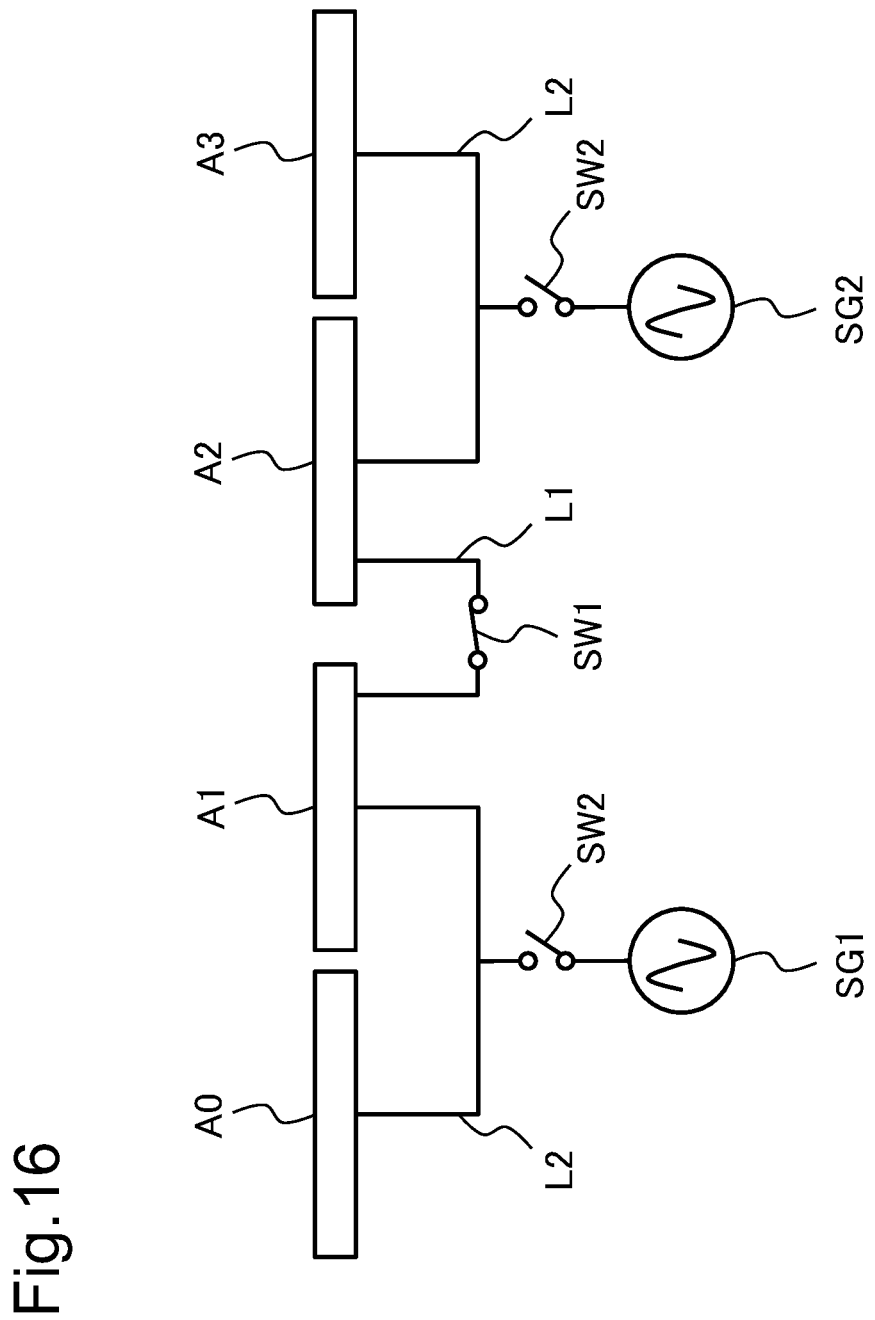
FIG. 16 is a conceptual diagram illustrating an example of a configuration of a switch included in a display antenna according to the present disclosure.

FIGS. 15 to 16 are conceptual diagrams illustrating an example of a configuration of antenna assemblies A. FIGS. 15 to 16 are related to an example of dividing antenna assembly A as illustrated in FIG. 14. FIGS. 15 to 16 are diagrams obtained by extracting four (antenna assembly A0, antenna assembly A1, antenna assembly A2, and antenna assembly A3) included in the touch sensor $TS_X$ for position detection in the X direction among the plurality of antenna assemblies A illustrated in FIG. 14. Each of the antenna assembly A0, the antenna assembly A1, the antenna assembly A2, and the antenna assembly A3 includes a plurality of patch antennas 111. The first switch SW1 is disposed on the wiring line L1 that electrically connects the antenna assembly A1 and the antenna assembly A2. The first switch SW1 is used to switch the connection between the antenna assembly A1 and the antenna assembly A2. The connection between the antenna assembly A1 and the antenna assembly A2 is switched according to opening and closing of the first switch SW1.

In the examples of FIGS. 15 to 16, the antenna assembly A0 and the antenna assembly A1 are electrically connected to each other through a wiring line L2. The common second switch SW2 is connected to the antenna assembly A0 and the antenna assembly A1 via the wiring line L2. The antenna assembly A0 and the antenna assembly A1 are connected to the common signal source SG1 via the second switch SW2. The antenna assembly A0 and the antenna assembly A1 constitute an antenna assembly AG1. The antenna assembly A2 and the antenna assembly A3 are electrically connected to each other through a wiring line L3. The common second switch SW2 is connected to the antenna assembly A2 and the antenna assembly A3 via the wiring line L3. The antenna assembly A2 and the antenna assembly A3 are connected to the common signal source SG2 via the second switch SW2. The antenna assembly A2 and the antenna assembly A3 constitute an antenna assembly AG2.

FIG. 15 is an example of a state (OFF) in which the first switch SW1 is opened and a state (ON) in which the second switch SW2 is closed. In this case, the antenna assembly AG1 and the antenna assembly AG2 function as separate phased array antennas. When the second switch SW2 connected to the signal source SG1 is turned on, the signal source SG1 and the antenna assembly AG1 are connected. Similarly, when the second switch SW2 connected to the signal source SG2 is turned on, the signal source SG2 and the antenna assembly AG2 are connected. According to the high frequency power supplied from the signal source SG1 and the signal source SG2, a signal to be transmitted supplied through the signal line $L_S$ is transmitted as a wireless signal from the antenna assembly AG1 and the antenna assembly AG2.

FIG. 16 illustrates a state (ON) in which the first switch SW1 is closed and a state (OFF) in which the second switch SW2 is opened. In this case, the antenna assembly A0, the antenna assembly A1, the antenna assembly A2, and the antenna assembly A3 function as the touch sensor $TS_X$ for position detection in the X direction. A plurality of antenna assemblies A functioning as the touch sensor is connected in a grid in the X direction and the Y direction to form touch panel electrodes.

Furthermore, the control unit 15 controls display on the display 12. The control unit 15 causes the plurality of light emitters 120 constituting the display 12 to emit light in such a way that a user interface for receiving an operation input is displayed. The control unit 15 causes the plurality of light emitters 120 to emit light in such a way that display information for performing selection and operation at the detection position is displayed in association with the detection position of the touch panel set in the antenna array 11. In a case where the user interface is not displayed, the control unit 15 may cause the plurality of light emitters 120 constituting the display 12 to emit light in such a way that an image unrelated to the touch panel is displayed. A display control unit (not illustrated) other than the control unit 15 may be used for display control of the display 12.

Figure 17:
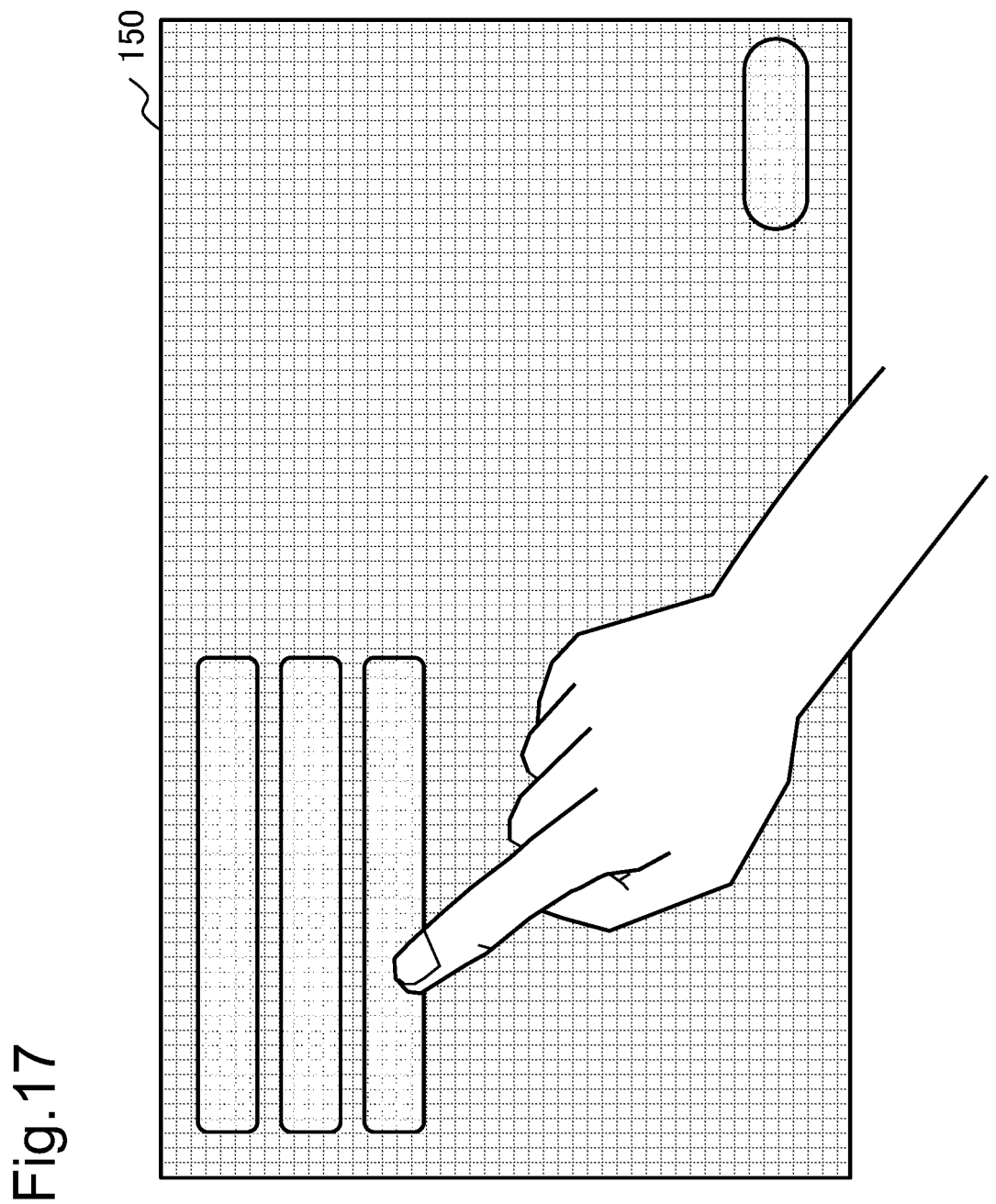
FIG. 17 is a conceptual diagram illustrating an example of a user interface displayed on a screen of a terminal device on which a display antenna according to the present disclosure is mounted.

FIG. 17 is a conceptual diagram illustrating an example in which the display antenna 10 is mounted on a terminal device used by a user. On a screen 150 of the terminal device, an image of the display 12 included in the display antenna 10 is displayed. The function of the touch panel of the display antenna 10 is set on the screen 150 of the terminal device. FIG. 17 illustrates an example in which a user interface is displayed on the screen 150. FIG. 17 illustrates a state in which one of the buttons included in the user interface displayed on the screen 150 is selected by the user. In FIG. 17, images in the row direction and the column direction of the touch sensors constituting the touch panel are illustrated in a mesh-like pattern, but the size and interval of the touch sensors to be actually formed are not accurately represented.

In the example of FIG. 17, the display antenna 10 detects a position touched by a user's finger. The display antenna 10 receives an input related to the display information displayed at the detected position. A portion of the screen 150 of the terminal device that does not function as a touch panel functions as a phased array antenna. As described above, the display antenna 10 can simultaneously exert the function of the touch panel and the function of the phased array antenna. The display antenna 10 may exert only the function of the touch panel. The display antenna 10 may exert only the function of the phased array antenna.

As described above, the display antenna of the present example embodiment includes the antenna array, the first switch group, the second switch group, the display, and the control unit. The antenna array includes a plurality of patch antennas arrayed in a grid. The patch antenna is transparent to light in the visible region. The first switch group includes the first switch disposed on the wiring line connecting two adjacent patch antennas. The second switch group includes the second switch disposed on the wiring line connecting the antenna assembly formed by at least four adjacent patch antennas and a signal source connected to at least one patch antenna constituting the antenna assembly. The display includes a plurality of light emitters arrayed in a grid. The light emitter is disposed below the patch antenna. The control unit controls opening and closing of the plurality of first switches and the plurality of second switches. The control unit controls opening and closing of the plurality of first switches to combine the plurality of patch antennas in such a way that the antenna assembly is formed in a size related to the frequency band of the radio wave to be transmitted and received. The control unit controls a plurality of light emitters constituting the display. The control unit sets the second switches connected to the plurality of patch antennas constituting the antenna assembly to function as the touch sensor to an open state. In a state where the second switch is opened, the control unit closes the first switch connected to a patch antenna at the position of the vertex of the antenna assembly that functions as the touch sensor. In this way, the control unit configures a touch panel in which a plurality of antenna assemblies functioning as the touch sensor are arrayed in the row direction and the column direction. The control unit detects a contact position on the touch panel according to a change in capacitance at an intersection of a row formed by the plurality of antenna assemblies arrayed in the row direction and a column formed by the plurality of antenna assemblies arrayed in the column direction.

The display antenna of the present example embodiment changes the size of the antenna assembly by changing the connection state of the plurality of patch antennas. The display antenna of the present example embodiment exerts the function of the touch sensor by connecting a plurality of antenna assemblies each including a plurality of patch antennas arrayed in a grid in the row direction and the column direction. That is, the display antenna of the present example embodiment has a function of a touch panel, and can change a wavelength band of a radio wave to be transmitted and received.

In an aspect of the present example embodiment, the patch antenna is square. The plurality of patch antennas is arrayed in a diamond shaped pattern. The at least four adjacent patch antennas constitute an antenna assembly. The first switch is disposed on a wiring line connecting vertices of two adjacent patch antennas. The second switch is disposed on the wiring line connecting at least one patch antenna constituting the antenna assembly with the signal source. In the present example embodiment, the antenna array includes square patch antennas arrayed in a diamond shaped pattern. According to the present example embodiment, the display antenna including the antenna device capable of exerting the functions of the touch panel and the phased array antenna can be achieved by the antenna array including the square patch antennas arrayed in the diamond shaped pattern.

In an aspect of the present example embodiment, a phase shifter that phase-shifts a radio wave to be transmitted and received is disposed between each of the plurality of patch antennas and a signal line through which a signal to be transmitted and received propagates. In the reception of a radio wave to be received, the control unit receives the radio wave to be received in a state where the second switch connected to at least one patch antenna constituting the phased array functioning as the phased array antenna is open. In the transmission of the radio wave to be transmitted, the control unit closes the second switch connected to at least one patch antenna constituting the antenna assembly functioning as the phased array antenna, and transmits the signal to be transmitted propagating through the signal line. According to the present aspect, it is possible to achieve a phased array antenna in which a phase shifter is disposed for each of a plurality of patch antennas.

In an aspect of the present example embodiment, the control unit configures an antenna assembly that functions as the touch sensor and an antenna assembly that functions as the phased array antenna with different sizes. According to the present aspect, the area of the touch sensor and the area of the phased array antenna can be set independently. Therefore, according to the present aspect, the degree of freedom in setting the touch sensor and the phased array antenna can be improved.

In an aspect of the present example embodiment, the light emitter includes a micro light-emitting diode (LED). According to the present aspect, since the area occupied by the light emitter in the display antenna can be reduced by using the micro LED, the degree of freedom in design is improved.

In an aspect of the present example embodiment, the light emitter includes a micro LED that emits light in the red, green, and blue wavelength bands. According to the present aspect, the use of the micro LEDs that emit light in the red, green, and blue wavelength bands improves the degree of freedom in color representation of an image displayed on the display.

Second Example Embodiment

Next, a display antenna according to a second example embodiment will be described with reference to the drawings. The display antenna of the present example embodiment includes a display having the functions of a touch sensor and an antenna. In the present example embodiment, an example in which an antenna assembly includes a plurality of patch antennas will be described. The antenna assembly can function as a phased array antenna and a touch sensor. The present example embodiment is different from the first example embodiment in that a patch antenna around a patch antenna that functions as a touch sensor is made inactive.

(Configuration)

Figure 18:
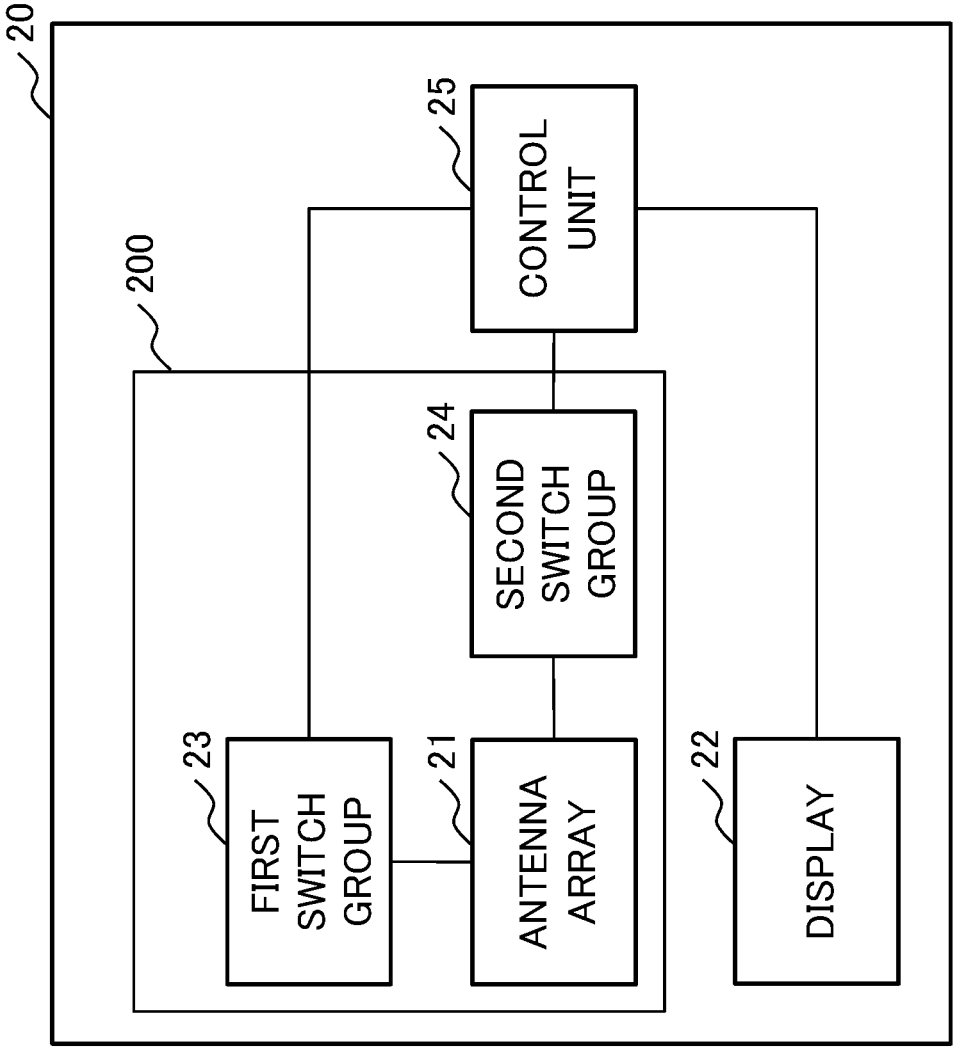
FIG. 18 is a block diagram illustrating an example of a configuration of a display antenna according to the present disclosure.

FIG. 18 is a block diagram illustrating an example of a configuration of a display antenna 20 according to the present disclosure. The display antenna 20 includes an antenna array 21, a display 22, a first switch group 23, a second switch group 24, and a control unit 25. The antenna array 21, the first switch group 23, and the second switch group 24 constitute an antenna device 200. The control unit 25 may be added to the antenna device 200. The display antenna 20 has a structure in which the antenna device 200 is superimposed on the display 22. For example, the antenna device 200 and the display 22 may be provided as separate products.

The antenna array 21 has a configuration similar to that of the antenna array 11 of the first example embodiment. The antenna array 21 includes a plurality of patch antennas. The patch antenna is a plate-shaped radiation element. The patch antenna is a transparent electrode capable of transmitting light in a wavelength band in a visible region. For example, the patch antenna may be made of a material that transmits light in a near-infrared region, an infrared region, or an ultraviolet region.

The display 22 has a configuration similar to that of the display 12 of the first example embodiment. The display 22 includes a plurality of light emitters (not illustrated). The plurality of light emitters is disposed in a two-dimensional array. The display 22 is formed above a wiring layer (not illustrated). The light emitter is connected to a driving unit (not illustrated) via the wiring line formed in the wiring layer. The light emitter emits light according to the control of the driving unit by the control unit 25.

The first switch group 23 has a configuration similar to that of the first switch group 13 of the first example embodiment. The first switch group 23 includes a plurality of first switches. The first switch is disposed on the wiring line connecting two adjacent patch antennas. The first switch is a switch that switches connection between two adjacent patch antennas. The first switch is also used to switch connection between adjacent antenna assemblies. The first switch may be provided for each patch antenna or may be provided for each antenna assembly. When the first switch is provided for each antenna assembly, the first switches of the plurality of patch antennas constituting the antenna assembly may be omitted. The plurality of first switches is formed in the wiring layer. The size of the antenna assembly can be changed by switching the open/close state of the first switch. By switching the open/close state of the first switch, an antenna assembly that functions as a touch panel can be selected.

The second switch group 24 has a configuration similar to that of the second switch group 14 of the first example embodiment. The second switch group 24 includes a plurality of second switches. The second switch is disposed on the wiring line connecting the antenna assembly A formed by at least four adjacent patch antennas and a signal source connected to at least one patch antenna constituting the antenna assembly. The second switch is a switch that switches connection between the antenna assembly and the signal source. The signal source is a high frequency power source used for transmission of a radio wave to be transmitted. The signal source supplies high frequency power related to the frequency band of the radio wave to be transmitted and the transmission strength of the radio wave. The plurality of second switches is formed in the wiring layer. The antenna assembly connected to the second switch in the closed state (ON) is supplied with high frequency power from a signal source.

The control unit 25 (control means) has a configuration similar to that of the control unit 15 of the first example embodiment. The control unit 25 controls the antenna array 21 to configure an antenna assembly. The control unit 25 sets the size of the antenna assembly in accordance with the frequency band of the radio wave to be transmitted and received. The control unit 25 switches ON/OFF of the plurality of first switches included in the first switch group 23 to change the combination of patch antennas constituting the antenna assembly. As a result, the size of the antenna assembly is set in accordance with the frequency band of the radio wave to be transmitted and received.

The control unit 25 switches ON/OFF of the plurality of second switches included in the second switch group 24 in a state where the antenna assembly is set. The control unit 25 switches the second switch connected to at least one of the patch antennas constituting the antenna assembly used for transmission of the radio wave. The antenna assembly including the patch antenna connected to the second switch in the ON state is supplied with high frequency power from the signal source. As a result, the radio wave to be transmitted related to the signal propagated through the signal line is transmitted from the antenna assembly.

The control unit 25 selects an antenna assembly to be caused to function as a touch sensor. The control unit 25 selects adjacent antenna assemblies in such a way that the plurality of antenna assemblies to function as the touch sensor is arrayed in a mesh pattern. The control unit 25 electrically connects two adjacent antenna assemblies among the selected antenna assemblies. The first switch disposed on the wiring line connecting the two adjacent antenna assemblies among the antenna assemblies to function as the touch sensor is switched to ON. As a result, a meshed touch sensor is formed by the plurality of antenna assemblies connected by the first switch switched to ON. The contact position can be identified according to a change in electrostatic capacitance between a row constituted by the plurality of antenna assemblies coupled in the X direction and a column constituted by the plurality of antenna assemblies coupled in the Y direction. Details of the detection of the contact position by the control unit 25 will not be described.

Figure 19:
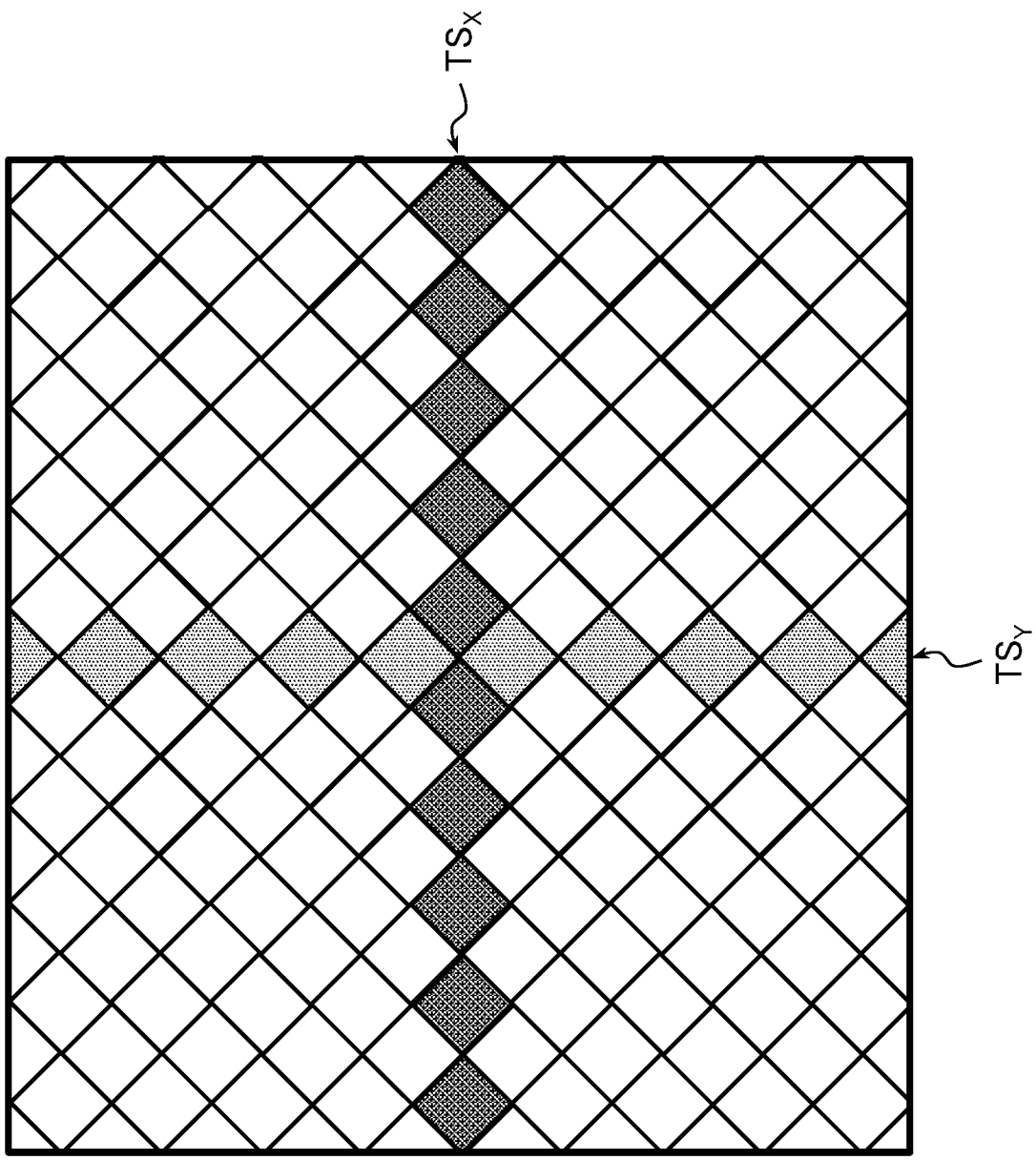
FIG. 19 is a conceptual diagram illustrating an example of a touch sensor included in an antenna array included in a display antenna according to the present disclosure.

FIG. 19 is a conceptual diagram illustrating an example of a touch sensor included in the antenna array 21 included in the display antenna 20. In FIG. 19, one rhombic region represents one antenna assembly. In FIG. 19, regions between adjacent antenna assemblies are omitted. The control unit 25 switches the first switch disposed on the wiring line between the antenna assemblies functioning as the touch sensor $TS_X$ for position detection in the X direction to ON. The control unit 25 switches the first switch disposed on the wiring line between the antenna assemblies functioning as touch sensor $TS_Y$ for position detection in the Y direction to ON. As a result, part of the touch panel electrode in which the touch sensor $TS_X$ for position detection in the X direction and the touch sensor $TS_Y$ for position detection in the Y direction are disposed in a mesh shape (in a grid) is formed.

In the example of FIG. 19, the control unit 25 causes a patch antenna that does not function as a touch sensor to function as an antenna. The control unit 25 closes the first switch between the patch antennas to function as the antenna, and forms an antenna assembly having a size related to the wavelength of the radio wave to be transmitted. The control unit 25 closes the second switch connected to the antenna assembly to function as the antenna, and connects the antenna assembly to the signal source.

When the touch sensor and the antenna are configured as illustrated in FIG. 19, there is a portion where the antenna assembly for the touch panel and the antenna assembly for the antenna are close to each other. In such a case, noise is mixed from the antenna assembly for the antenna to the antenna assembly for the touch panel in a portion where the antenna assembly for the touch panel and the antenna assembly for the antenna are close to each other. As a result, the antenna assembly for the antenna and the antenna assembly for the touch panel may interfere with each other.

Figure 20:
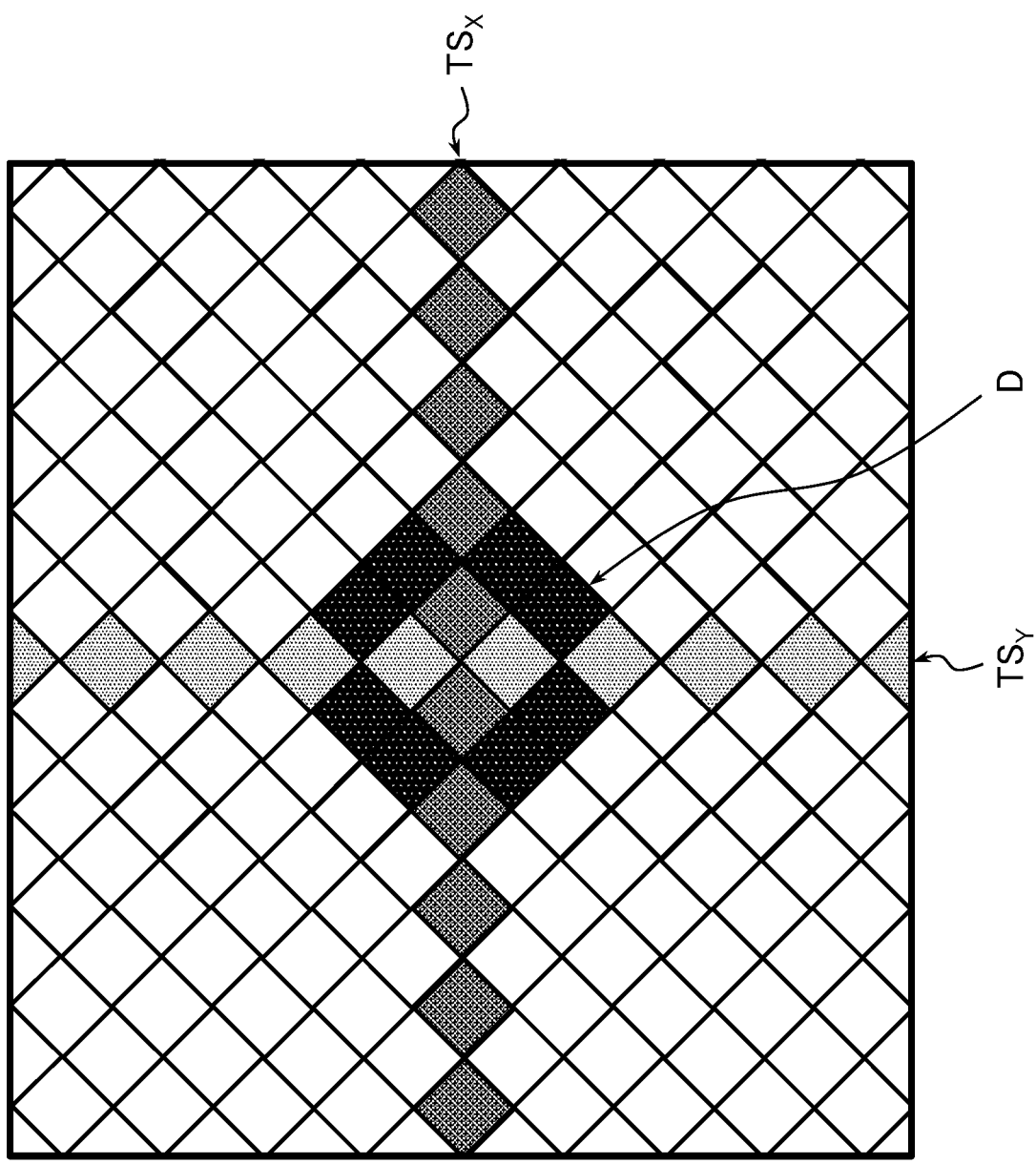
FIG. 20 is a conceptual diagram illustrating another example of a touch sensor included in an antenna array included in a display antenna according to the present disclosure.

FIG. 20 is a conceptual diagram illustrating another example of the touch sensor included in the antenna array 21 included in the display antenna 20. In FIG. 20, a dead area D is set around a portion where the touch sensor $TS_X$ for position detection in the X direction and the touch sensor $TS_Y$ for position detection in the Y direction intersect. The antenna assembly not located in the dead area D is controlled as in FIG. 19. The control unit 25 opens the second switch connected to the antenna assembly located in the dead area D and separates the antenna assembly from the signal source. In a case where the touch sensor and the antenna are configured as illustrated in FIG. 20, the touch sensor $TS_X$ for position detection in the X direction and the touch sensor $TS_Y$ for position detection in the Y direction are less likely to interfere with each other at a portion where the touch sensor $TS_X$ and the touch sensor $TS_Y$ intersect with each other. That is, in a case where the touch sensor and the antenna are configured as illustrated in FIG. 20, interference at a portion where the antenna assembly for the touch panel and the antenna assembly for the antenna are closer to each other is reduced as compared with the example of FIG. 19.

Figure 21:
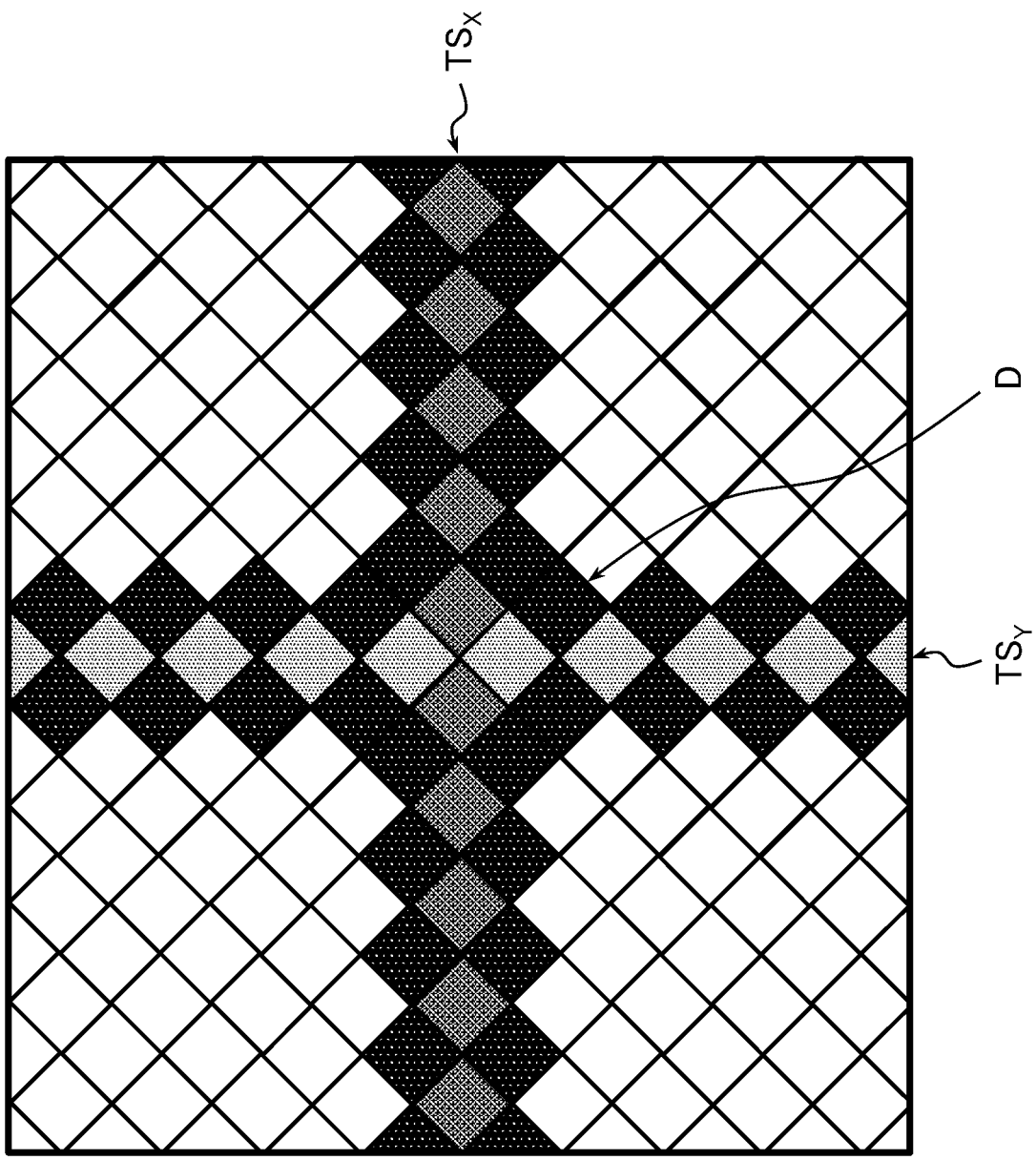
FIG. 21 is a conceptual diagram illustrating still another example of a touch sensor included in an antenna array included in a display antenna according to the present disclosure.

FIG. 21 is a conceptual diagram illustrating still another example of the touch sensor included in the antenna array 21 included in the display antenna 20. In FIG. 21, the antenna assembly around a portion where the touch sensor $TS_X$ for position detection in the X direction and the touch sensor $TS_Y$ for position detection in the Y direction intersect is set as the dead area D. Further, in FIG. 21, the antenna assembly of a portion along the touch sensor $TS_X$ for position detection in the X direction and the touch sensor $TS_Y$ for position detection in the Y direction is set as the dead area D. The antenna assembly other than the portion set in the dead area D is controlled as in the example of FIG. 19. The control unit 25 opens the second switch connected to the antenna assembly of the portion set in the dead area D, and separates the antenna assembly from the signal source. In a case where the touch sensor and the antenna are configured as illustrated in FIG. 21, interference at a portion where the touch sensor $TS_X$ for position detection in the X direction and the touch sensor $TS_Y$ for position detection in the Y direction intersect is reduced. Furthermore, in a case where the touch sensor and the antenna are configured as illustrated in FIG. 21, interference in a portion along the touch sensor $TS_X$ for position detection in the X direction and the touch sensor $TS_Y$ for position detection in the Y direction is reduced. That is, in a case where the touch sensor and the antenna are configured as illustrated in FIG. 21, interference at a portion where the antenna assembly for the touch panel and the antenna assembly for the antenna are closer to each other is reduced as compared with the example of FIG. 20.

Figure 22:
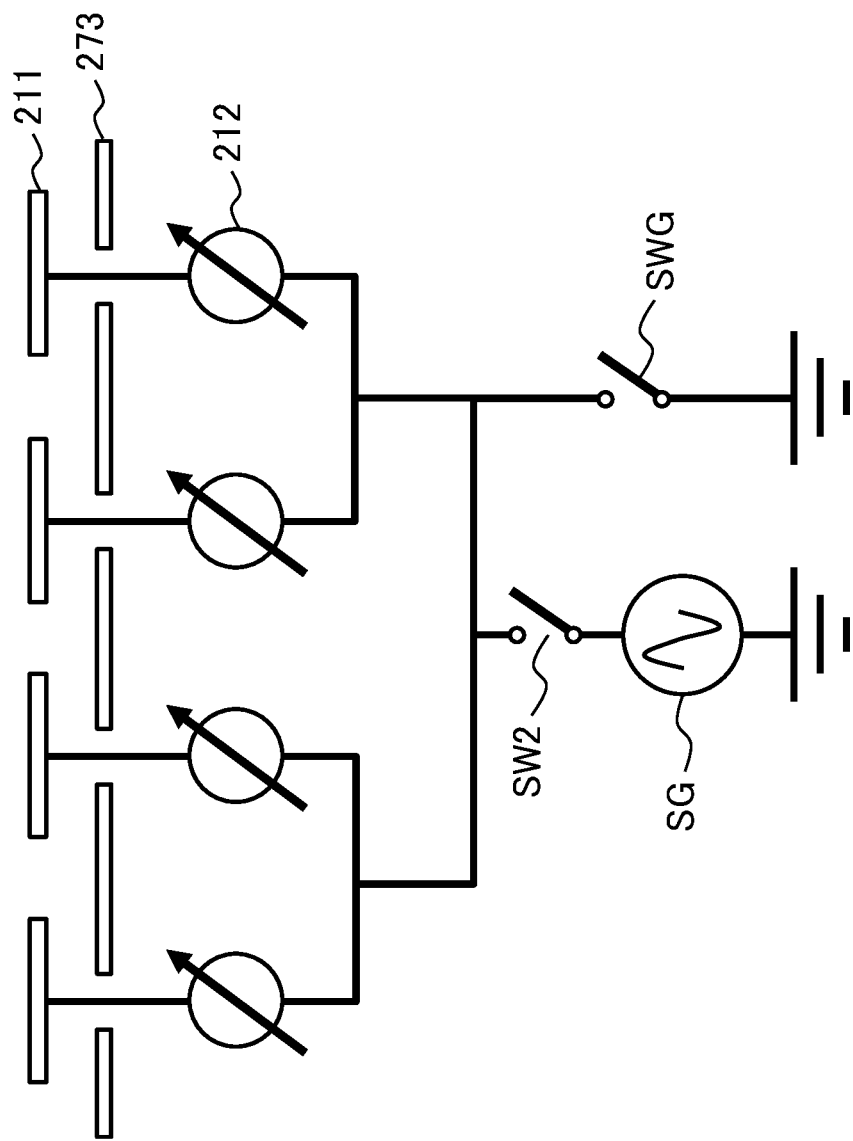
FIG. 22 is a conceptual diagram illustrating an example of a configuration of a wiring line included in a display antenna according to the present disclosure.

FIG. 22 is a conceptual diagram illustrating an example of a configuration of the wiring line included in the display antenna 20. FIG. 22 is a view of part of a cross section of the display antenna 20 when viewed from a side viewing. FIG. 22 illustrates a patch antenna 211, a phase shifter 212, a ground electrode 273, a second switch SW2, a signal source SG, and a ground switch SWG. In FIG. 22, reference signs of the first switch and the wiring line are omitted. In FIG. 22, an antenna layer is formed by the plurality of patch antennas 211. A shield layer is formed below the antenna layer by the plurality of ground electrodes 273. Each of the plurality of patch antennas 211 is connected to the phase shifter 212 via the wiring line. The phase shifter 212 is connected to the signal source SG via the second switch SW2. The phase shifter 212 is connected to the ground via ground switch SWG. Normally, the ground switch SWG is in an open state.

When the second switch SW2 is in the closed state, the plurality of patch antennas 211 is connected to the signal source SG via the phase shifter 212. A high frequency signal oscillated by the signal source SG is supplied to the phase shifter 212 connected to the signal source SG. The high frequency signal phase-shifted by the phase shifter 212 is supplied to the patch antenna 211 connected to the phase shifter 212. The high frequency signal supplied to the patch antenna 211 is transmitted as a wireless signal.

On the other hand, when the second switch SW2 is in the open state, the plurality of patch antennas 211 float from the potential of the signal source SG and become inactive. The control unit 25 opens the second switch SW2 connected to the patch antenna set in the dead area D. As a result, the patch antenna 211 connected to the second switch SW2 in the open state transitions to the dead state. When the ground switch SWG is in the closed state, the patch antenna 211 connected to the ground switch SWG is grounded via the phase shifter 212. As a result, the patch antenna 211 connected to the ground switch SWG in the closed state transitions to the dead state. When the ground switch SWG is closed, the patch antenna set in the dead area D is grounded. Therefore, it is possible to effectively prevent interference at a portion where the patch antenna for the touch panel and the patch antenna for the antenna are close to each other.

Figure 23:
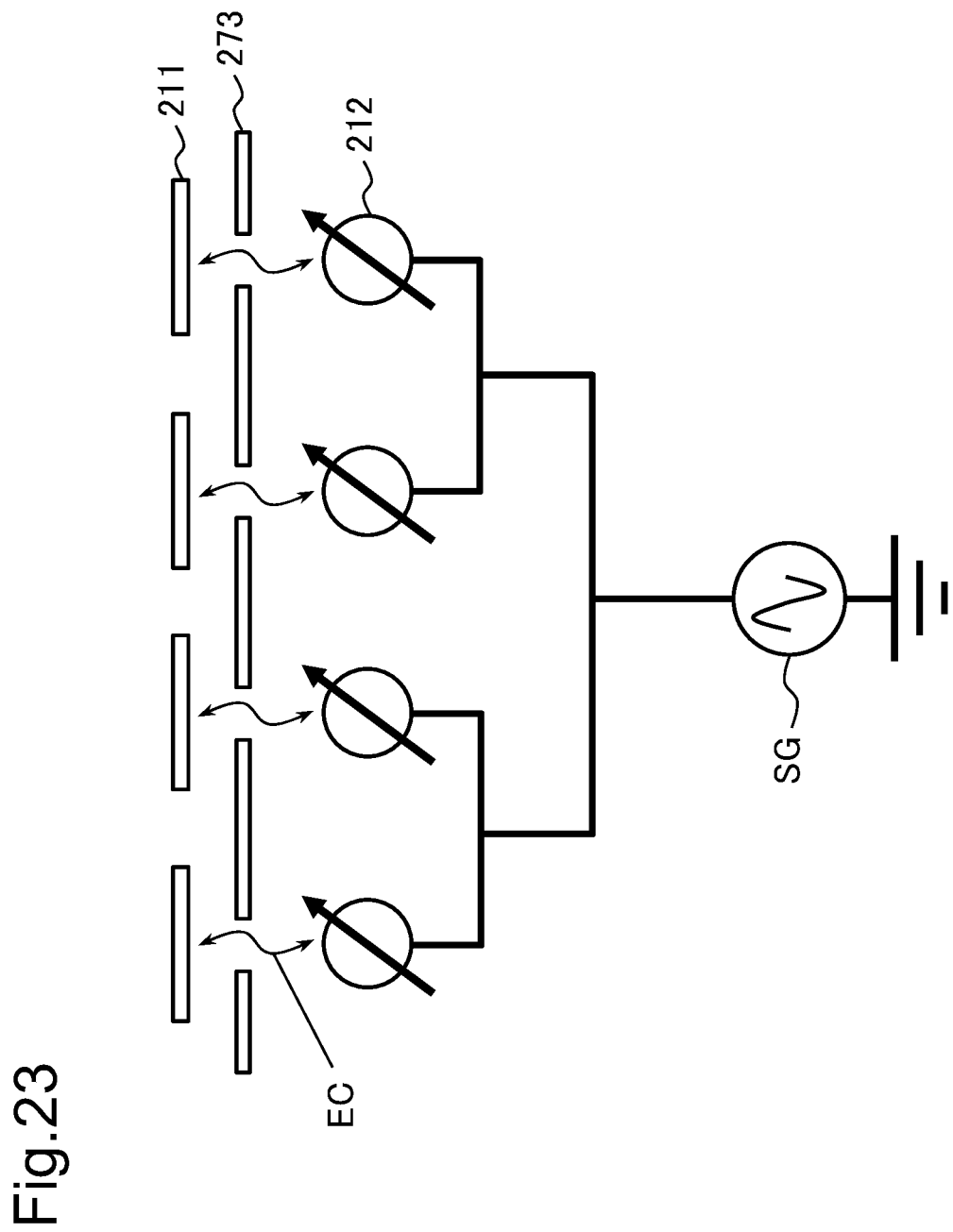
FIG. 23 is a conceptual diagram illustrating another example of the configuration of a wiring line included in a display antenna according to the present disclosure.

FIG. 23 is a conceptual diagram illustrating another example of the configuration of the wiring line included in the display antenna 20. FIG. 23 is a view of part of a cross section of the display antenna 20 when viewed from a side viewing. FIG. 23 illustrates the patch antenna 211, the phase shifter 212, the ground electrode 273, and the signal source SG. In FIG. 23, reference signs of the first switch and the wiring line are omitted. In FIG. 23, an antenna layer is formed by the plurality of patch antennas 211. A shield layer is formed below the antenna layer by the plurality of ground electrodes 273. Each of the plurality of patch antennas 211 is connected to the phase shifter 212 by electromagnetic coupling EC. The phase shifter 212 is connected to the signal source SG.

When the high frequency signal is supplied from the signal source SG, the high frequency signal phase-shifted by the phase shifter 212 is supplied to the patch antenna 211 associated with the phase shifter 212 by the electromagnetic coupling EC. The high frequency signal supplied to the patch antenna 211 is transmitted as a wireless signal. On the other hand, when the supply of the high frequency signal from the signal source SG is stopped, the plurality of patch antennas 211 float from the potential of the signal source SG and become inactive. As a result, the patch antenna 211 to which the supply of the high frequency signal is stopped transitions to the dead state. In the case of the example of FIG. 23, even when the second switch SW2 and the ground switch SWG are omitted, the patch antenna set in the dead area D can transition to a state of floating from the signal source SG.

As described above, the display antenna of the present example embodiment includes the antenna array, the first switch group, the second switch group, the display, and the control unit. The antenna array includes a plurality of patch antennas arrayed in a grid. The patch antenna is transparent to light in the visible region. The first switch group includes the first switch disposed on the wiring line connecting two adjacent patch antennas. The second switch group includes the second switch disposed on the wiring line connecting the antenna assembly formed by at least four adjacent patch antennas and a signal source connected to at least one patch antenna constituting the antenna assembly. The display includes a plurality of light emitters arrayed in a grid. The light emitter is disposed below the patch antenna. The control unit controls opening and closing of the plurality of first switches and the plurality of second switches. The control unit controls opening and closing of the plurality of first switches to combine the plurality of patch antennas in such a way that the antenna assembly is formed in a size related to the frequency band of the radio wave to be transmitted and received. The control unit controls a plurality of light emitters constituting the display. The control unit sets the second switches connected to the plurality of patch antennas constituting the antenna assembly to function as the touch sensor to an open state. In a state where the second switch is opened, the control unit closes the first switch connected to a patch antenna at the position of the vertex of the antenna assembly that functions as the touch sensor. In this way, the control unit configures a touch panel in which a plurality of antenna assemblies functioning as the touch sensor is arrayed in the row direction and the column direction. The control unit inactivates a patch antenna adjacent to a portion where the antenna assembly that functions as the touch sensor and the antenna assembly that functions as the antenna intersect with each other. The control unit detects a contact position on the touch panel according to a change in capacitance at an intersection of a row formed by the plurality of antenna assemblies arrayed in the row direction and a column formed by the plurality of antenna assemblies arrayed in the column direction.

The display antenna of the present example embodiment changes the size of the antenna assembly by changing the connection state of the plurality of patch antennas. The display antenna of the present example embodiment exerts the function of the touch sensor by connecting a plurality of antenna assemblies each including a plurality of patch antennas arrayed in a grid in the row direction and the column direction. The display antenna of the present example embodiment inactivates a patch antenna adjacent to a portion where an antenna assembly that functions as a touch sensor and an antenna assembly that functions as an antenna intersect. Therefore, noise mixing from the antenna to the touch sensor is reduced in a portion where the antenna assembly that functions as the touch sensor and the antenna assembly that functions as the antenna intersect. That is, according to the present example embodiment, interference from the antenna to the touch sensor is less likely to occur at a portion where the antenna assembly that functions as the touch sensor and the antenna assembly that functions as the antenna intersect with each other.

In an aspect of the present example embodiment, the control unit inactivates the patch antennas adjacent to the antenna assembly that functions as the touch sensor. Therefore, interference due to noise mixing from the antenna to the touch sensor is reduced. That is, according to the present aspect, interference from the antenna to the touch sensor is less likely to occur over the entire antenna assembly that functions as the touch sensor.

Third Example Embodiment

Next, an antenna array according to a third example embodiment will be described with reference to the drawings. The antenna array of the present example embodiment has a simplified configuration of the antenna device included in the display antennas according to the first and second example embodiments.

Figure 24:
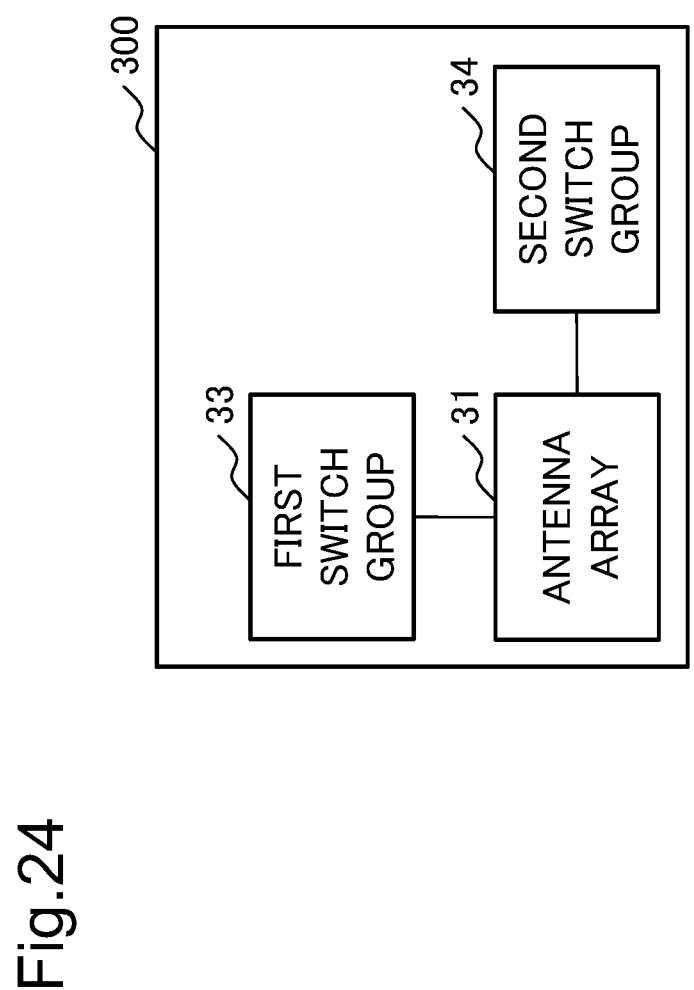
FIG. 24 is a block diagram illustrating an example of a configuration of an antenna device according to the present disclosure.

FIG. 24 is a block diagram illustrating an example of a configuration of an antenna device 300 according to the present disclosure. The antenna device 300 includes an antenna array 31, a first switch group 33, and a second switch group 34.

The antenna array 31 includes a plurality of patch antennas arrayed in a grid. The first switch group 33 includes the first switch disposed on the wiring line connecting two adjacent patch antennas. The second switch group 34 includes the second switch disposed on the wiring line connecting the antenna assembly formed by at least four adjacent patch antennas and a signal source connected to at least one patch antenna constituting the antenna assembly.

As described above, the antenna device of the present example embodiment changes the size of the antenna assembly by changing the connection state of the plurality of patch antennas. The antenna device of the present example embodiment exerts the function of the touch sensor by connecting a plurality of antenna assemblies each including a plurality of patch antennas arrayed in a grid in the row direction and the column direction. That is, the antenna device of the present example embodiment has the function of a touch panel, and can change the wavelength band of the radio wave to be transmitted and received.

(Hardware)

Next, a hardware configuration that executes control and processing according to each example embodiment of the present disclosure will be described with reference to the drawings. An example of such a hardware configuration is an information processing device 90 (computer) in FIG. 25. The information processing device 90 in FIG. 25 is a configuration example for executing control and processing of each example embodiment, and does not limit the scope of the present disclosure.

Figure 25:
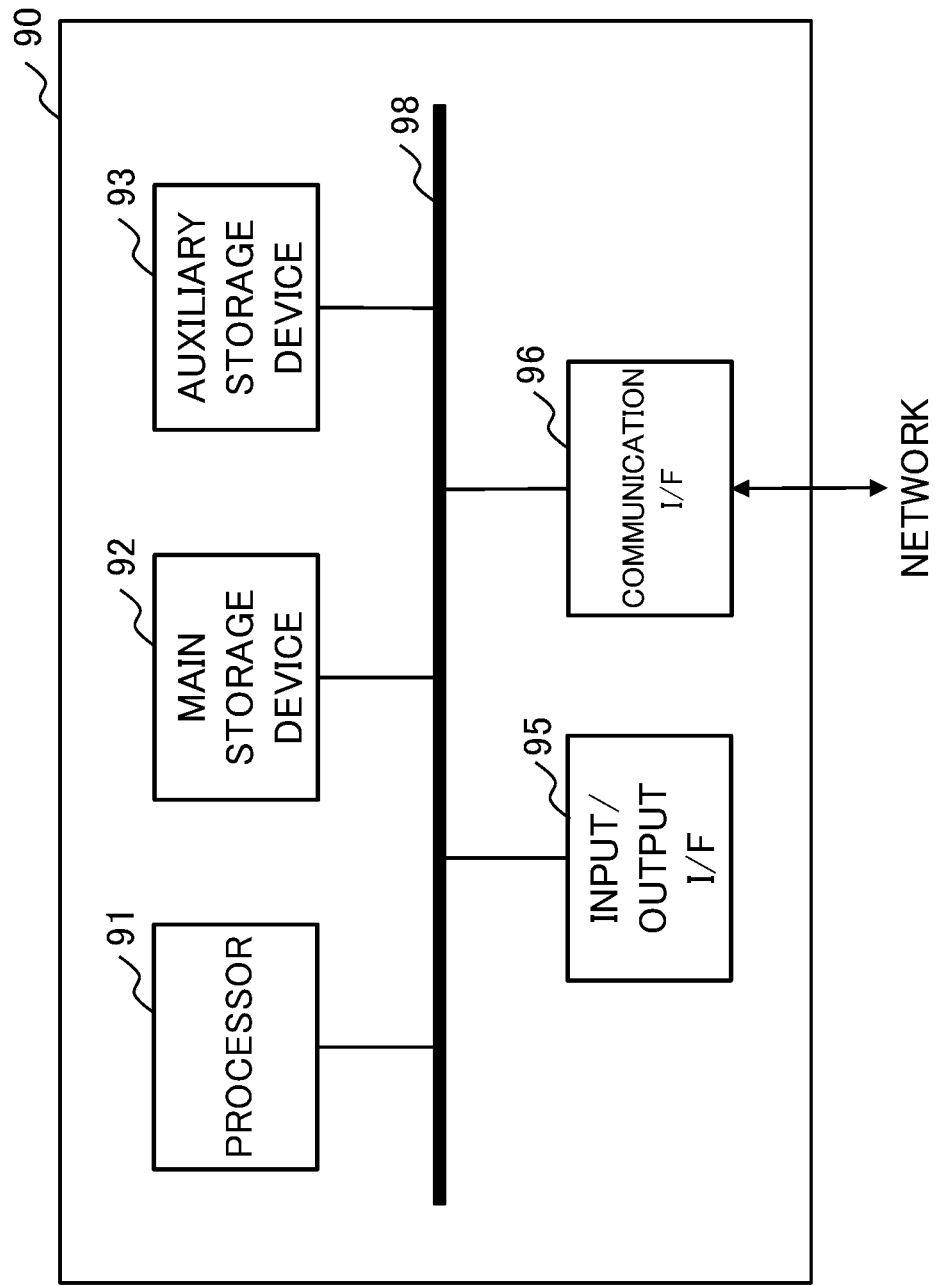
FIG. 25 is a block diagram illustrating an example of a hardware configuration that executes control and processing according to each example embodiment.

As illustrated in FIG. 25, the information processing device 90 includes a processor 91, a main storage device 92, an auxiliary storage device 93, an input/output interface 95, and a communication interface 96. In FIG. 25, the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program (instruction) stored in the auxiliary storage device 93 or the like in the main storage device 92. For example, the program is a software program for executing control and processing of each example embodiment. The processor 91 executes the program developed in the main storage device 92. The processor 91 executes the program to execute control and processing according to each example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). As the main storage device 92, a nonvolatile memory such as a magnetoresistive random access memory (MRAM) may be configured/added.

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. As an interface connected to an external device, the input/output interface 95 and the communication interface 96 may be shared.

An input device such as a keyboard, a mouse, or a touch panel may be connected to the information processing device 90 as necessary. These input devices are used to input of information and settings. In a case where a touch panel is used as the input device, a screen having a touch panel function serves as an interface. The processor 91 and the input device are connected via the input/output interface 95.

The information processing device 90 may be provided with a display device that displays information. In a case where a display device is provided, the information processing device 90 includes a display control device (not illustrated) that controls display of the display device. The information processing device 90 and the display device are connected via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of a hardware configuration for enabling control and processing according to each example embodiment of the present disclosure. The hardware configuration of FIG. 25 is an example of a hardware configuration that executes control and processing according to each example embodiment, and does not limit the scope of the present disclosure. A program for causing a computer to execute control and processing according to each example embodiment is also included in the scope of the present disclosure.

A program recording medium in which the program according to each example embodiment is recorded is also included in the scope of the present disclosure. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium. In a case where the program executed by the processor is recorded in the recording medium, the recording medium is a program recording medium.

The components of each example embodiment may be combined in any manner. The components of each example embodiment may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

(Supplementary Note 1)
  An antenna device including
    an antenna array including a plurality of patch antennas arrayed in a grid,
    a first switch group including a first switch disposed on a wiring line connecting two adjacent patch antennas, and
    a second switch group including a second switch disposed on a wiring line connecting an antenna assembly formed by at least four adjacent patch antennas with a signal source connected to at least one patch antenna constituting the antenna assembly.

(Supplementary Note 2)
  The antenna device according to Supplementary Note 1, wherein
    each of the patch antennas has a square shape, wherein
    the plurality of patch antennas is arrayed in a diamond shaped pattern, wherein
    at least four adjacent patch antennas constitute the antenna assembly, wherein
    the first switch is disposed on a wiring line connecting vertexes of two adjacent patch antennas, and wherein
    the second switch is disposed on a wiring line connecting at least one patch antenna constituting the antenna assembly with the signal source.

(Supplementary Note 3)
  The antenna device according to Supplementary Note 2, further including
    a control unit that controls opening and closing of a plurality of the first switches and a plurality of the second switches, wherein
    the control unit
      combines the plurality of patch antennas in such a way that the antenna assembly is configured with a size matching a frequency band of a radio wave to be transmitted and received by controlling opening and closing of the plurality of the first switches.

(Supplementary Note 4)
  The antenna device according to Supplementary Note 3, wherein
    the control unit
      configures a touch panel in which a plurality of the antenna assemblies functioning as a touch sensor is arrayed in a row direction and a column direction by closing the first switch connected to a patch antenna at a position of a vertex of the antenna assembly functioning as the touch sensor in a state where the second switch connected to the plurality of patch antennas constituting the antenna assembly functioning as the touch sensor is opened, and
      detects a contact position on the touch panel according to a change in capacitance at an intersection of a row formed by the plurality of the antenna assemblies arrayed in the row direction and a column formed by the plurality of the antenna assemblies arrayed in the column direction.

(Supplementary Note 5)
  The antenna device according to Supplementary Note 4, wherein
    a phase shifter that phase-shifts a radio wave to be transmitted and received is disposed between each of the plurality of patch antennas and a signal line through which a signal to be transmitted and received propagates, and wherein
    in reception of a radio wave to be received, the control unit
      receives the radio wave to be received in a state where the second switch connected to at least one patch antenna constituting the antenna assembly functioning as a phased array antenna is opened, and
    in transmission of a radio wave to be transmitted, the control unit
      closes the second switch connected to the at least one patch antenna constituting the antenna assembly functioning as the phased array antenna and transmits a signal to be transmitted propagating through the signal line.

(Supplementary Note 6)
  The antenna device according to Supplementary Note 5, wherein
    the control unit
      configures an antenna assembly that functions as the touch sensor and an antenna assembly that functions as the phased array antenna with different sizes.

(Supplementary Note 7)
  The antenna device according to Supplementary Note 4, wherein
    the control unit
      makes a patch antenna adjacent to a portion where an antenna assembly that functions as the touch sensor and an antenna assembly that functions as an array antenna intersect inactive.

(Supplementary Note 8)
  The antenna device according to Supplementary Note 7, wherein
    the control unit
      makes a patch antenna adjacent to the antenna assembly that functions as the touch sensor inactive.

(Supplementary Note 9)
A display antenna including
the antenna device according to any one of Supplementary Notes 4 to 8, and
a display configured by a plurality of light emitters arrayed in a grid, wherein
the patch antenna
is transparent to light in a visible region, and wherein
the light emitters
are disposed below the patch antenna.

(Supplementary Note 10)
The display antenna according to Supplementary Note 9, wherein
a control unit included in the antenna device
configures a touch panel by controlling a plurality of first switches and a plurality of second switches,
displays, on the display, a user interface associated with a position on the touch panel,
detects a contact position on the touch panel according to a change in capacitance at an intersection of a row formed by a plurality of the antenna assemblies arrayed in the row direction and a column formed by a plurality of the antenna assemblies arrayed in the column direction, and
determines input information selected by associating the detected contact position with the input information displayed at the contact position on the display.

(Supplementary Note 11)
The display antenna according to Supplementary Note 9, wherein
each of the light emitters
includes a micro light-emitting diode (LED).

(Supplementary Note 12)
The display antenna according to Supplementary Note 11, wherein
each of the light emitters
includes the micro LEDs that emit light in red, green, and blue wavelength bands.

The invention claimed is:

1. An antenna device comprising:
an antenna array including a plurality of patch antennas arrayed in a diamond-shaped pattern, wherein each of the plurality of patch antennas has a square shape;
a first switch group including a first switch disposed on a wiring line connecting vertices of two first patch antennas of the plurality of patch antennas, wherein the two first patch antennas are adjacent to one another;
a second switch group including a second switch disposed on a wiring line connecting a first given antenna assembly of a plurality of antennas assemblies with a signal source, the first given antenna assembly formed and constituted by at least four second patch antennas of the plurality of the patch antennas with a signal source, wherein the at least four second patch antennas are adjacent to one another, and wherein the wiring line is connected to at least one of the four second patch antennas; and
a controller including a memory storing instructions, and a processor that is configured to execute the instructions to:
control opening and closing of a plurality of switches of the first switch group to configure the plurality of patch antennas in such a way that the first given antenna assembly has a size that matches a frequency band of a radio wave to be transmitted and received, wherein the plurality of switches of the first switch group includes the first switch;
configure a touch panel in which one or more of second given antenna assemblies of the plurality of antenna assemblies are functioning as a touch sensor and is arrayed in a row direction and a column direction, by closing the first switch connected to the first patch antenna at a position of a vertex of the first given antenna assembly functioning as the touch sensor in a state where the second switch connected to the at least four second patch antennas constituting the first given antenna assembly functioning is opened; and
detect a contact position on the touch panel according to a change in capacitance at an intersection of a row formed by the plurality of the antenna assemblies arrayed in the row direction and a column formed by the plurality of the antenna assemblies arrayed in the column direction.

2. The antenna device according to claim 1, further comprising:
a phase shifter that phase-shifts the radio wave to be transmitted and received, wherein
the phase shifter is disposed between each of the plurality of patch antennas and a signal line through which a signal to be transmitted and received via the radio wave propagates, and
the processor is configured to execute the instructions to further:
open, in reception of the radio wave, the second switch connected to at least one of the four second patch antennas constituting the first given antenna assembly, which is functioning as a phased array antenna, and receive the radio wave; and
close, in transmission of radio wave to be transmitted, the second switch connected to the at least one of the four second patch antennas constituting the first given antenna assembly, which is functioning as the phased array antenna, and transmit the signal to be transmitted propagating through the signal line via the radio wave.

3. The antenna device according to claim 2, wherein
the processor is configured to execute the instructions to further:
configure the first given antenna assembly that is functioning as the phased array antenna and the one or more second given antenna assemblies that are functioning as the touch sensor with different sizes.

4. The antenna device according to claim 1, wherein
the processor is configured to execute the instructions to further:
render inactive a patch antenna of the plurality of patch antennas that is adjacent to a portion where the one or more second given antenna assemblies that are functioning as the touch sensor and the first given antenna assembly that is functioning as the phase array antenna intersect.

5. The antenna device according to claim 4, wherein
the processor is configured to execute the instructions to further:
render inactive a patch antenna of the plurality of patch antennas that is adjacent to the one or more second given antenna assemblies that are functioning-functions as the touch sensor.

6. A display antenna comprising:
the antenna device according to claim 1; and
a display configured by a plurality of light emitters arrayed in a grid, wherein
the plurality of patch antennas is transparent to light in a visible region, and the light emitters are disposed below the plurality of patch antennas.

7. The display antenna according to claim 6, wherein the processor is configured to execute the instructions to further:
display, on the display, a user interface associated with a position on the touch panel; and
determine input information selected by associating the detected contact position with the input information displayed at the contact position on the display.

8. The display antenna according to claim 6, wherein each of the plurality of light emitters includes one or more micro light-emitting diodes (LEDs).

9. The display antenna according to claim 8, wherein the one or more micro LEDs of each of the plurality of light emitters include red, green, and blue micro LEDs that emit light in red, green, and blue wavelength bands, respectively.

* * * * *